(12) United States Patent
Hubble, III et al.

(10) Patent No.: US 6,639,669 B2
(45) Date of Patent: Oct. 28, 2003

(54) DIAGNOSTICS FOR COLOR PRINTER ON-LINE SPECTROPHOTOMETER CONTROL SYSTEM

(75) Inventors: Fred F. Hubble, III, Rochester, NY (US); Tonya L. Love, Rochester, NY (US); Lalit K. Mestha, Fairport, NY (US); Gary W. Skinner, Rochester, NY (US); Dennis M. Diehl, Penfield, NY (US); Robert E. Grace, Fairport, NY (US); Eric Jackson, Penfield, NY (US); Yao Rong Wang, Webster, NY (US)

(73) Assignee: Xerox Corporation, Stamford, CT (US)

( * ) Notice: Subject to any disclaimer, the term of this patent is extended or adjusted under 35 U.S.C. 154(b) by 140 days.

(21) Appl. No.: 09/949,475

(22) Filed: Sep. 10, 2001

(65) Prior Publication Data

US 2003/0063275 A1 Apr. 3, 2003

(51) Int. Cl.⁷ .............................. G01J 3/42; G01J 3/46
(52) U.S. Cl. ........................................ 356/319; 356/402
(58) Field of Search ............................. 356/402, 237.5, 356/319; 250/226; 347/19, 232; 399/9; 358/504, 518

(56) References Cited

U.S. PATENT DOCUMENTS

| | | | |
|---|---|---|---|
| 5,137,364 A | | 8/1992 | McCarthy |
| 5,272,518 A | | 12/1993 | Vincent |
| 5,363,318 A | * | 11/1994 | McCauley .................. 702/85 |
| 5,671,059 A | | 9/1997 | Vincent |
| 5,748,221 A | | 5/1998 | Castelli et al. |
| 5,838,451 A | | 11/1998 | McCarthy |
| 5,844,680 A | | 12/1998 | Sperling |
| 5,963,333 A | | 10/1999 | Walowit et al. |
| 6,020,583 A | | 2/2000 | Walowit et al. |
| 6,147,761 A | | 11/2000 | Walowit et al. |
| 6,157,454 A | | 12/2000 | Wagner et al. |
| 6,351,308 B1 | * | 2/2002 | Mestha ...................... 356/402 |
| 6,526,240 B1 | * | 2/2003 | Thomas et al. .............. 399/72 |
| 6,538,770 B1 | * | 3/2003 | Mestha ...................... 358/1.9 |
| 6,567,170 B2 | * | 5/2003 | Tandon et al. ............. 356/406 |

* cited by examiner

Primary Examiner—Zandra V. Smith
Assistant Examiner—Gordon J Stock

(57) ABSTRACT

In a color analysis method in which sheets with multiple different color printed test patches are moved relative to a color analyzing spectrophotometer, and in which fiducial marks are printed adjacent to respective test patches and optically detected by a fiducial mark detector to provide a triggering system for the respective test patch analysis, there is provided automatic diagnostic testing of the spectrophotometer and the fiducial mark triggering system, including automatically generating special test sheets, some of which may include test areas of varying density black.

13 Claims, 11 Drawing Sheets

DIAGNOSTICS FOR COLOR PRINTER ON-LINE SPECTROPHOTOMETER CONTROL SYSTEM

Cross-reference and incorporation by reference is made to the following and commonly assigned U.S. patent applications: U.S. application Ser. No. 09/448,987, filed Nov. 24, 1999, now U.S. Pat. No. 6,351,308 issued Feb. 26, 2002, and U.S. application Ser. No. 09/449,263, filed Nov. 24, 1999, now U.S. Pat. No. 6,538,770 issued Mar. 25, 2003, both by the same Lingappa K. Mestha; and U.S. application Ser. No. 09/535,007, filed Mar. 23, 2000, by Fred F. Hubble, III and Joel A. Kubby, now U.S. Pat. No. 6,384,918 issued May 7, 2002, with an equivalent EPO Publication, No. 103799, dated May 30, 2001; U.S. application Ser. No. 09/862,945, filed May 22, 2001, by Fred F. Hubble, III, Tonya L. Love and Daniel A. Robins, now allowed, entitled "Angular, Azimuthal and Displacement Insensitive Spectrophotometer For Color Printer Color Control Systems," U.S. application Ser. No. 09/862,247, filed May 22, 2001, by the same Lingappa K. Mestha and Jagdish C. Tandon, entitled "Color Imager Bar Based Spectrophotometer for Color Printer Color Control System," U.S. application Ser. No. 09/863,042, filed May 22, 2001, by the same Lingappa K. Mestha, Jagdish C. Tandon and Fred F. Hubble, III, entitled "Color Imager Bar Based Spectrophotometer Photodetector Optical Orientation," now U.S. Pat. No. 6,556,300 issued Apr. 29, 2003, and U.S. application Ser. No. 09/888,791, filed Jun. 25, 2001, by the same Lingappa K. Mestha and Jagdish C. Tandon, entitled "Simultaneous Plural Colors Analysis Spectrophotometer," now U.S. Pat. No. 6,567,170 issued May 20, 2003.

Disclosed in the embodiments herein is an improved automatic self-diagnostics system for detecting operational anomalies and the like in the control system of an in situ color sensor. More specifically, particular diagnostics for a color spectrophotometer based system for color detection, calibration and/or correction which is highly suitable for incorporation into the color calibration or control system of various color printing systems or other on-line color control or color processing systems.

The diagnostics systems of the disclosed embodiments have different features or aspects. One is to insure correct interrogation of the operating characteristics of an in situ (on line) color sensor for sensing xerographically printed different color test patterns in a color printer. More specifically, to diagnostically provide assurance that the color sensor is reading the correct (intended) color test target patches and thus is operating to provide reliable color data collection. Especially, for measuring such color test targets on paper sheets moving at variable speeds.

More specifically, in one aspect of the diagnostics systems of the disclosed embodiments, in a diagnostics mode a series of diagnostic test patches are automatically generated, printed on test sheets and read by the spectrophotometer or colorimeter and its output signals are compared to acceptable signal levels, in order to assure that the spectrophotometer or colorimeter measurements represented thereby are correct. In particular, providing a series of test targets of different light absorption density for testing the sensed signal responses to the illumination of the different test targets to their illumination by the respective different LEDs or other light sources. That is, generating a series of solid area test patches of varying optical density, position, and/or colors, which are respectively illuminated and read by the light emitters and photodetectors of the spectrophotometer or calorimeter. Those readings are used to determine whether the device is operating correctly by comparing them to expected readings.

Another aspect of the disclosed diagnostics systems of the disclosed embodiments is to provide automatic confirmation testing for the density and readability of fiducial marks on the test sheets of multiple color test patches, which fiducial marks automatically control the reading of respective said color test patches by an associated spectrophotometer or calorimeter. That is, a periodic automatic diagnostics interrogation for malfunctions in a fiducial mark sensing system comprising xerographically produced fiducial marks and an optical fiducial mark sensor used to trigger the occurrence of a desired event, such as the arrival of a test pattern for measuring a color. This provides assurance that color measuring triggering system is robust enough for reliable color data collection.

In one embodiment thereof the spectrophotometer normally used for color patch color sensing is used in a diagnostics mode for testing the developability (printing) curve for the marking material of the color (usually black) used for the fiducial marks, by printing none, varying amounts, and normal amounts, of the fiducial marking material into what would normally be color test patch areas. That is, assuming the spectrophotometer tests normally, the spectrophotometer may be used, in effect, as a fiducial mark detector for the testing of the (separate) optical fiducial mark detector. As further disclosed in the embodiments, a diagnostic routine of having the fiducial mark detector and the spectrophotometer sensor(s), separately or at the same time, examine a series of automatically printed graded density test patches of the fiducial marking material, starting with the darkest, and counting them until they are no longer detectable, can indicate, inter alia, at which density level of the fiducial marking material on the test sheets the fiducial mark detector will fail to detect fiducial marks (fail to deliver control signals). This diagnostic test can also tell how close the fiducial mark detector is to failure to read normal density fiducial marks.

By way of background, the general concept of fiducial marks adjacent to, and identifying, respective test color patches, and optical fiducial mark detectors separate from (but electronically controlling) the spectrophotometer detector, are known (see the above-cited and other references). However, there are practical restraints, associated with the particular spectrophotometer, etc., on how many distinguishable test patches can be printed on a normal sheet size test sheet, that is, how small they can be and how closely they can be spaced. Also, if the spectrophotometer is fixed relative to a sheet path, and the test sheet is moving normally in one direction in that path, the area of the test sheet in which the test patches can be printed and still be "seen" by the spectrophotometer as the test sheet moves past the fixed position spectrophotometer may be further limited. Also, the movement velocity of the test sheet relative to the spectrophotometer may vary. Yet, more test patches per sheet means that fewer test sheets need be used, and thus is desirable. Furthermore, even the blackest toner may not print sufficiently black fiduciary marks on print media (the test sheets) to be reliably detected if the printer developablity level control is out of adjustment, the black toner supply is depleted, the fiducial mark optical sensor is contaminated with paper lint or toner, the sensor signal amplifiers drift, etc. Yet, accurately knowing which one of the many test patches on a test sheet the spectrophotometer is reading (i.e., which spectrophotometer output signals are for which test color or test gray shade) is vital, and a missed fiducial mark can confuse that. Using mere blank (unprinted white paper) spaces in between color patches read by the spectrophotometer itself as the fiducial indicators for counting reading discrete patches is known, but is not as reliable as separate dark fiducial marks read by a separate detector therefor.

Printing fiducial marks along side of, rather than in between, each color test patch is desirable, although not essential. It can enable closer spacing of the color test patches. Also, it can provide more mounting location lateral freedom or space for a separate fiducial mark optical sensor (detector) without interference with the spectrophotometer illuminator(s) and detector(s).

Further by way of background, there is an additional significant challenge in implementing a multiple (or plural) LED type of spectrophotometer color sensor in a reprographic machine paper path to read accurately in "real time." That is, utilizing a type of spectrophotometer as shown in the example herein and as further exemplified and described in the above cross-referenced applications, in which each small test patch is sequentially illuminated by different LEDs of different illumination spectra, and the separate reflectances of those separate sequential illuminations of that same test patch are reliably detected, all while the test sheet bearing that and many other such test patches to be read is on normal print media rapidly passing by the spectrophotometer sensing zone in "real time." As noted above, this "real time" reading accuracy is facilitated by using separate black fiducial or timing marks associated with each test patch, and a separate reflective sensor for those fiducial marks, which may be attached to the side of the multiple LED spectrophotometer. That fiducial mark sensor can be a simple commercially available optical sensor, such as from Vactec 130E01721, which, for example, can change its output signal state from low to high (e.g., ~0.2V to 4.8V) when a black mark imprinted alongside a test patch passes within the illumination/sensing area of that fiducial mark sensor. That control signal can then control the operation of the spectrophotometer LEDs to read the test patches synchronous with the arrival and passage of the desired test patch in the sensing area of the spectrophotometer.

As disclosed in the embodiments, the spectrophotometer test patch sensor(s) and the associated fiducial marks sensor may be operating synchronously and in coordination. Both may be desirably located in a printer paper path, which can be an electrically noisy and easily optically contaminating area, such as from paper lint or loose toner. Thus, it is possible that malfunctions of that test patch reading equipment and process may occur which would cause test patch measurement errors.

Therefore it is desirable to be able to diagnostically interrogate and evaluate readings from the sensors with appropriate tests to assure proper operation prior to and/or in between regular print job printings and/or at other intervals during use. It is also desirable to be able to provide said diagnostic tests with minimal additional cost, without requiring additional hardware, substantially increased machine overhead or run time, and with relatively low paper and toner consumption.

It must be appreciated that some of the specific details of the exemplary diagnostics tests of the disclosed diagnostics systems embodiments may vary depending on the type of spectrophotometer being utilized. The spectrophotometer example shown here has only four different LEDs, all commonly central optical axis mounted, and four angularly and radially spaced multiple-photo-site three or four color detectors. In contrast, the earlier-filed above-cited incorporated applications, etc., show spectrophotometers with a single central optical axis sensor and a much larger number LEDs, and in which those LEDs are angularly and radially spaced from the central optical axis, i.e., reversed in position with the currently illustrated photodetectors. The subject diagnostics systems are suitable for either of those, and various other, spectrophotometers and color testing equipment.

Various of these diagnostics tests may also be usable for testing of some off-line spectrophotometer or other color testing systems, including those in which a spectrophotometer is not a part of a color printing system. Even if the spectrophotometer is moved relative to a stationary diagnostics test sheet, instead of being stationarily mounted in a color printer paper path. However, controlled relative movement may still be desirable.

With the disclosed diagnostics systems, by using relatively simple test sheets of different types, interrogation of various aspects the proper operation of spectrophotometer LEDs, spectrophotometer sensor(s) {photodetectors(s)}, and any separate fiducial marks sensor, can all be accomplished. The test sheets may be provided by automatically printing in the subject printer an appropriate set of test sheets with test patterns of selected or known density and patch locations printed on conventional available white paper print media, and conventionally feeding those test sheets through the sensing area (nip) of the spectrophotometer. The output signal responses of the sensor(s) may then be recorded and compared to the expected response for that respective test. Significant deviations from the expected signal outputs may be interpreted as malfunctions, and remedial actions may then be initiated, automatically or by diagnostic displays. For example, automatically initiating further diagnostic tests, and/or displaying an operator or tech rep instruction to clean, or replace, potentially contaminated or defective sensors or associated circuitry.

Of background interest as to a "self calibrating color printer", and color print test patterns, is an HP U.S. Pat. No. 5,508,826 issued Apr. 16, 1996 to William J. Lloyd, et al.

Referring now to the spectrophotometer embodiment disclosed herein, as noted, it is merely exemplary. This particular example is disclosed in greater detail in the above-cited applications, especially said D/99660Q, now U.S. Pat. No. 6,351,308 issued Feb. 26, 2002 and Q1, now U.S. Pat. No. 6,538,770 issued Mar. 25, 2003, and need not be described in great detail herein. It may employ only a small limited number of different spectra LED or other illumination sources, as shown, or up to sixteen or more different illumination sources. Desirably it can provide multiple data outputs suitable for broad spectral data reconstruction from a single or plural different spectral responsive photo-sites, by detecting light reflected by a sequence of single or plural color test target areas sequentially illuminated by those illumination sources, and/or white light illuminated, to rapidly provide broad spectrum data Although not limited thereto, the exemplary spectrophotometer of the embodiment herein is shown and described herein in desirable combination as an integral part of an automatic on-line continuous color table correction system of a color printer, in which this low cost spectrophotometer may be affordably provided in the output path of each color printer for automatic measurement of printed color test patches of printer output, without any manual effort or intervention being required. Such color control systems are further described in the above and below cited co-pending applications and patents. For example, in Xerox Corp. U.S. Pat. No. 6,178,007 B1, issued Jan. 23, 2001, based on U.S. application Ser. No. 08/786,010, filed Jan. 21, 1997 by Steven J. Harrington, now U.S. Pat. No. 6,178,007 issued Jan. 23, 2001, Attorney Docket No. D/96644, entitled "Method For Continuous Incremental Color Calibration For Color Document Output Terminals." The European patent application equivalent thereof was published by the European Patent Office on Jul. 22, 1998 as EPO Publication No. 0 854 638 A2. Also, Xerox Corp. U.S. Pat. No. 6,222,648, issued Apr. 24, 2001, based on U.S. application Ser. No. 08/787,524, also filed Jan. 21, 1997, by Barry Wolf, et al, entitled "On Line Compensation for Slow Drift of Color Fidelity in Document Output Terminals (DOT)," now U.S. Pat. No. 6,222,648 issued Apr. 24, 2001, Attorney Docket No. D/96459. Also noted in this regard are Xerox Corp. U.S. Pat. No. 6,157,469, issued Dec. 5, 2000 and filed May 22, 1998 by Lingappa K. Mestha; Apple Computer, Inc. U.S. Pat. No. 5,881,209, issued Mar. 9, 1999; U.S. Pat. No. 5,612,902 issued Mar. 18, 1997 to Michael Stokes, and other patents and applications further noted below.

A low cost, relatively simple, spectrophotometer, as disclosed herein, is thus particularly (but not exclusively) highly desirable for such a "colorimetry" function for such an on-line printer color correction system. Where at least one dedicated spectrophotometer is provided in each printer, its cost and other factors becomes much more significant, as compared to the high cost (and other unsuitability's for on-line use) of typical laboratory spectrophotometers.

An early patent of interest as to using a calorimeter in the printed sheets output of a color printer is Xerox Corp. U.S. Pat. No. 5,748,221, issued May 5, 1998 to Vittorio Castelli, et al, filed Nov. 1, 1995 (D/95398). This patent is also of particular interest here for its Col. 6, lines 18 to 28, description of measuring color:

" . . . by imaging a part of an illuminated color patch on three amorphous silicon detector elements after filtering with red, green and blue materials. The technology is akin to that of color input scanners. The detector outputs can be used as densitometric values to assure color consistency. Calibration of the resulting instrument outputs against measurement by laboratory colorimeters taken over a large sample of patches made by the toners of the printer of interest allows mapping to absolute color coordinates (such as L*a*b*)."

Automatic on-line color recalibration systems can be much more effective with an on-line color measurement system where a spectrophotometer may be mounted in the paper path of the moving copy sheets in the printer, preferably in the output path after fusing or drying, without having to otherwise modify the printer, or interfere with or interrupt normal printing, or the movement of the printed sheets in said paper path, and yet provide accurate color measurements of test color patches printed on the moving sheets as they pass the spectrophotometer. That enables a complete closed loop color control of a printer.

Although the specific exemplary low cost color spectrophotometer embodiment herein is shown as a desirable on-line part of an exemplary color printer automatic color control system for color calibration and re-calibration, it will be appreciated that this or other versions of that spectrophotometer are not limited to that disclosed application. Color measurements, and/or the use of color measurements for various other color quality or consistency control functions, are also important for many other different technologies and applications, such as in the production of textiles, wallpaper, plastics, paint, inks, etc. Thus, the disclosed spectrophotometer and/or its related color detection system and/or controls may have applications in various such other fields where various other materials or objects are desirably color tested and/or process controlled. Another application of improved on-line color printing control enabled by a low cost, non-contact, spectrophotometer for spectral analysis and direct color control feedback is to provide much more accurate, yet low cost, local user digital printing of remotely transmitted (over the internet or otherwise) digital camera (or scanned optical camera) color photographs over the internet. Color control of printed photographs, especially flesh tones, is particularly customer sensitive. Plural color test patches can be automatically generated and transmitted with the original photographic image source (adjacent to, or on pages before, or after, the photographic image) for reading their color reproduction accuracy at the output of the remote printer as described herein or otherwise.

By way of general background, studies have demonstrated that humans are particularly sensitive to spatial color variations. Typical full color printing controls, as well as typical color controls in other commercial industries, still typically utilize manual off-line color testing and still often require relatively frequent manual color adjustments by skilled operators. Both the cost and the difficulty of on-line use of prior color measurement apparatus and control systems, and the need for manual recalibration steps, has heretofore inhibited automation of many of such various commercial color testing and color adjustment systems. The disclosed lower cost spectrophotometer addresses both of those concerns.

By way of some examples of the construction or design of various other color spectrophotometers themselves, besides Xerox Corp. U.S. Pat. No. 5,748,221 above, and, especially, the above cross-referenced U.S. application Ser. No. 09/535,007, filed Mar. 23, 2000 by Fred F. Hubble, III and Joel A. Kubby, there is noted HP U.S. Pat. No. 5,671,059, issued Sep. 23, 1997; and HP U.S. Pat. No. 5,272,518, issued Dec. 21, 1993; Accuracy Microsensor, Inc. U.S. Pat. No. 5,838,451 and U.S. Pat. No. 5,137,364, both issued to Cornelius J. McCarthy on Nov. 17, 1998 and Aug. 11, 1992, respectively; Color Savvy U.S. Pat. Nos. 6,147,761, 6,020,583, 5,963,333; BYK-Gardner U.S. Pat. No. 5,844,680; and Colorimeter U.S. Pat. No. 6,157,454.

Also of background interest here is that white (instead of narrow spectrum) LED illuminators and plural sensors with different color filters are disclosed in an EP Patent Application No. 0 921 381 A2, published Sep. 6, 1999 for a color sensor for inspecting color print on newspaper or other printed products.

By way of further background, or expressing it in other words, for a desirably low cost implementation of a spectrophotometer with plural light emitting diodes (LEDs) as the respective different color light sources, LEDs of different colors may be selected and switched on individually in sequence to illuminate a test target for a brief length of time sufficient for enough information to be extracted by a photocell of the reflectance spectra of the substrate. Over a number of years, a concentrated effort in the Xerox Corporation Wilson Research Center has designed and built a relatively low cost experimental spectrophotometer using, for example, 10 LEDs, as part of a printer color control system dynamically measuring the color of test patches on the printed output media "on line," that is, while the media is still in the sheet transport or paper path of a print engine, for real-time and fully automatic printer color correction applications. A limited example of that color control system capability was presented in a restricted public technology capability demonstration by Xerox Corporation at the international "Drupa 2000" show in Germany (without public disclosure of the hardware, software or technical details, or any offers to sell). Further details of the specific spectrophotometer embodiment so utilized are disclosed in the prior above first-paragraph cross-referenced patent application by Fred F. Hubble, III and Joel A. Kubby. Each LED thereof was selected to have a narrow band response curve in the spectral space. Ten LEDs provided 10 color calibration measurements on the spectral reflectance curve. The LEDs are switched on one at a time and the reflected light was detected by a single photodetector as a photo-current which may be integrated for few milliseconds to give a voltage output. Thus, 10 voltage outputs per each measured color test patch are available with such a spectrophotometer using 10 LEDs. These voltages may be converted directly to L*a*b* color space, or to 10 reflectance values and then to L*a*b* color space coordinates (if needed). The cost of that LED spectrophotometer hardware includes the head and printed wire board for mounting the LEDs, the lenses, the detector(s) and the basic switching electronics.

Other than the above Xerox Corp. experimental spectrophotometers, some others presently known include a grating-based spectrophotometer made by Ocean Optics Inc., LED based sensors marketed by "ColorSavvy" and Accuracy Microsensor (such as in their above-cited patents); and other spectrophotometers by Gretag MacBeth (Viptronic), ExColor, and X-Rite (DTP41). However, those other spectrophotometers are believed to have significant cost, measurement time, target displacement induced errors, and/or other difficulties, for use in real-time printer on-line measurements.

The particular example of a spectrophotometer illustrated herein may utilize a component chip or portion of a low UMC commercially available color image sensor array or bar, such as imager bars mass produced for commercial use in document scanners, combined with a suitable (and reduced) number of LEDs or other light sources to provide a spectrophotometer of suitable speed and spectral outputs for even lower cost than the above-described low cost 10 LED spectrophotometer. However, the diagnostics systems disclosed herein are not limited to any such specific spectrophotometer.

As used in the patent claims and elsewhere herein, unless otherwise specifically indicated, the term "spectrophotometer" may encompass a spectrophotometer, colorimeter, and densitometer, as broadly defined herein. That is, the word "spectrophotometer" may be given the broadest possible definition and coverage in the claims herein, consistent with the rest of the claim. The definition or use of such above terms may vary or differ among various scientists and engineers. However, the following is an attempt to provide some simplified clarifications relating and distinguishing the respective terms "spectrophotometer," "colorimeter," and "densitometer," as they may be used in the specific context of specification examples of providing components for an on-line color printer color correction system, but not necessarily as claim limitations.

A typical "spectrophotometer" measures the reflectance of an illuminated object of interest over many light wavelengths. Typical prior spectrophotometers in this context use 16 or 32 channels measuring from 400 nm to 700 nm or so, to cover the humanly visible color spectra or wavelength range. A typical spectrophotometer gives color information in terms of measured reflectances or transmittances of light, at the different wavelengths of light, from the test surface. (This is to measure more closely to what the human eye would see as a combined image of a broad white light spectra image reflectance, but the spectrophotometer desirably provides distinct electrical signals corresponding to the different levels of reflected light from the respective different illumination wavelength ranges or channels.) In other words, spectrophotometers may be considered as belong to the class of instruments known as reflectance densitometers. These devices measure the optical reflectivity of objects of interest, such as painted materials, fruit, printed media, etc., and operate by reflecting light off these objects onto a detector. Most other color densitometers known to the inventors are test devices typically employ broadband light sources such as tungsten filament lamps or flashed Xenon lamps plus means for determining the spectral content of the light reflected off the object. The latter is typically done with gratings or prisms which separate the light according to its wavelength in concert with an array of detectors disposed to collect flux of a particular wavelength, or, alternatively, a single detector that is mechanically scanned across this spread spectrum. Costs of these instruments typically range from $2,400 to $20,000, making them unsuitable for low cost installed applications.

A "colorimeter" normally has three illumination channels, red, green and blue. That is, generally, a "colorimeter" provides its three (red, green and blue or "RGB") values as read by a light sensor or detector receiving reflected light from a color test surface sequentially illuminated with red, green and blue illuminators, such as three different color LEDs or three lamps with three different color filters. It may thus be considered different from, or a limited special case of, a "spectrophotometer," in that it provides output color information in the trichromatic quantity known as RGB.

Trichromatic quantities may be used for representing color in three coordinate space through some type of transformation. Other RGB conversions to "device independent color space" (i.e., RGB converted to conventional L*a*b*) typically use a color conversion transformation equation or a "lookup table" system in a known manner. (Examples are provided in references cited herein, and elsewhere.)

A "densitometer" typically has only a single channel, and simply measures the amplitude of light reflectivity from the test surface, such as a developed toner test patch on a photoreceptor, at a selected angle over a range of wavelengths, which may be wide or narrow. A single illumination source, such as an IR LED, a visible LED, or an incandescent lamp, may be used. The output of the densitometer detector is programmed to give the optical density of the sample. A densitometer of this type is basically "color blind." For example, a cyan test patch and magenta test patch could have the same optical densities as seen by the densitometer, but, of course, exhibit different colors.

A multiple LED reflectance spectrophotometer, as in the examples of the embodiments herein, may be considered to belong to a special case of spectrophotometers which normally illuminate the target with narrow band or monochromatic light. Others, with wide band illumination sources, can be flashed Xenon lamp spectrophotometers, or incandescent lamp spectrophotometers. A spectrophotometer is normally programmed to give more detailed reflectance values by using more than 3 channel measurements (for example, 10 or more channel measurements), with conversion algorithms. That is in contrast to normal three channel colorimeters, which cannot give accurate, human eye related, reflectance spectra measurements, because they have insufficient measurements for that (only 3 measurements).

The spectrophotometer of the disclosed embodiment is especially suitable for being mounted at one side of the printed sheets output path of a color printer to optically evaluate color imprinted output sheets as they move past the spectrophotometer, variably spaced therefrom, without having to contact the sheets or interfere with the normal movement of the sheets. In particular, it may be used to measure a limited number of color test patch samples printed by the printer on actual printed sheet output of the printer during regular or selected printer operation intervals (between normal printing runs or print jobs). These color test sheet printing intervals may be at regular timed intervals, and/or at each machine "cycle-up," or as otherwise directed by the system software. The spectrophotometer may be mounted at one side of the paper path of the machine, or, if it is desired to use duplex color test sheets, two spectrophotometers may be mounted on opposite sides of the paper path.

Relatively frequent color recalibration of a color printer is highly desirable, since the colors actually printed on the output media (as compared to the colors intended to be printed) can significantly change, or drift out of calibration over time, for various known reasons. For example, changes in the selected or loaded print media, such as differences paper or plastic sheet types, materials, weights, calendaring, coating, etc. Or changes in the printer's ambient conditions, changes in the image developer materials, aging or wear of printer components, varying interactions of different colors being printed, etc. Printing test color patches on test sheets of the same print media under the same printing conditions during the same relative time periods as the color print job being color-controlled is thus very desirable.

It is thus also advantageous to provide dual-mode color test sheets, in which multiple color patches of different colors are printed on otherwise blank areas of each, or selected, banner, cover, or other inter-document or print job separator sheets. Different sets of colors may be printed on different banner or other test sheets. This dual use of such sheets saves both print paper and printer utilization time, and also provides frequent color recalibration opportunities where the printing system is one in which banner sheets are being printed at frequent intervals anyway.

An additional feature which can be provided is to tailor or set the particular colors or combinations of the test patches on a particular banner or other test sheet to those colors which are about to be printed on the specific document for that banner sheet, i.e., the document pages which are to be printed immediately subsequent to that banner sheet (the print job identified by that banner sheet). This can provide a "real time" color correction for the color printer which is tailored to correct printing of the colors of the very next document to be printed.

The preferred implementations of the systems and features disclosed herein may vary depending on the situation. Also, various of the disclosed features or components may be alternatively used for such functions as gray scale balancing, turning on more than one illumination source at once, such as oppositely positioned LEDs, etc.

It will be appreciated that these test patch images and colors may be automatically sent to the printer imager from a stored data file specifically designed for printing the dual mode banner sheet or other color test sheet page, and/or they may be embedded inside the customer job containing the banner page. That is, the latter may be directly electronically associated with the electronic document to be printed, and/or generated or transmitted by the document author or sender. Because the printed test sheet color patches colors and their printing sequence is known (and stored) information, the on-line spectrophotometer measurement data therefrom can be automatically coordinated and compared.

After the spectrophotometer or other color sensor reads the colors of the test patches, the measured color signals may be automatically processed inside the system controller or the printer controller to produce or modify the tone reproduction curve, as explained in the cited references. The color test patches on the next test sheet may then be printed with that new tone reproduction curve. This process may be repeated so as to generate further corrected tone reproduction curves. If the printer's color image printing components and materials are relatively stable, with only relatively slow long term drift, and there is not a print media or other abrupt change, the tone reproduction curve produced using this closed loop control system will be the correct curve for achieving consistent colors for at least one or even a substantial number of customer print jobs printed thereafter, and only relatively infrequent and few color test sheets, such as the normal banner sheets, need be printed.

However, if there are substantial changes in the print media being used by the printer, or other sudden and major disturbances in the printed colors (which can be detected by the spectrophotometer output in response to the test patches on the next dual mode banner sheet or other color test sheet or even, in certain instances, in the imprinted images) then the subsequent customer print job may have incorrect color reproduction. In these situations of customer print media changes in the printer (or new print jobs or job tickets that specify a change in print media for that print job), where that print media change is such that it may substantially affect the accuracy of the printed colors for that subsequent print job, it is not desirable to continue printing and then have to discard the next subsequent print jobs printed with customer unacceptable colors. In that situation it may be preferable in color critical applications to interrupt the normal printing sequence once the sudden color printing disturbance is detected and to instead print plural additional color test sheets in immediate succession, with different color test patch colors, to sense and converge on a new tone reproduction curve that will achieve consistent color printing for that new print media, and only then to resume the normal printing sequence of customer print jobs. Thus, the subsequent customer print jobs would then use the final, re-stabilized, tone reproduction curve obtained after such a predetermined number of sequential plural color test sheets have been printed.

This patent application is not related to or limited to any particular one of the various possible (see, for example, various of the cited references) algorithms or mathematical techniques for processing the electronic signals from the spectrophotometer to generate or update color correction tables, tone reproduction curves, or other color controls, and hence they need not be further discussed herein.

Various possible color correction systems can employ the output signals of spectrophotometers, using various sophisticated feedback, correction and calibration systems, which need not be discussed in any further detail here, since the general concepts and many specific embodiments are disclosed in many other patents (including those cited herein) and publications. In particular, to electronically analyze and utilize the spectrophotometer or other electronic printed color output information with a feedback analysis system for the color control systems for a printer or other color reproduction system. It is, however, desirable in such systems to be able to use a substantially reduced (smaller) number of color patch samples, printed at intervals during the regular printing operations, to provide relatively substantially continuous updating correction of the printer's color renditions over a wide or substantially complete color spectra. Noted especially in that regard is the above-cited Xerox Corp. Steven J. Harrington U.S. Pat. No. 6,178,007 B1.

Color correction and/or color control systems should not be confused with color registration systems or sensors. Those systems are for insuring that colors are correctly printed accurately superposed and/or accurately adjacent to one another, such as by providing positional information for shifting the position of respective color images being printed.

Other background patents which have been cited as to color control or correction systems for printers include the following U.S. patents: Xerox Corp. U.S. Pat. No. 5,963,244, issued Oct. 5, 1999 to L. K. Mestha, et al, entitled "Optimal Reconstruction of Tone Reproduction Curve" (using a lookup table and densitometer readings of photoreceptor sample color test patches to control various color printer parameters); U.S. Pat. No. 5,581,376, issued December 1996 to Harrington; U.S. Pat. No. 5,528,386, issued Jun. 18, 1996 to Rolleston et al.; U.S. Pat. No. 4,275,413, issued Jun. 23, 1981 to Sakamoto et al.; U.S. Pat. No. 4,500,919, issued Feb. 19, 1985 to Schreiber; U.S. Pat. No. 5,416,613, issued May 16, 1995 to Rolleston et al.; U.S. Pat. No. 5,508,826, filed Apr. 27, 1993 and issued Apr. 16, 1996 to William J. Lloyd et al.; U.S. Pat. No. 5,471,324, issued Nov. 28, 1995 to Rolleston; U.S. Pat. No. 5,491,568, issued Feb. 13, 1996 to Wan; U.S. Pat. No. 5,539,522, issued Jul. 23, 1996 to Yoshida; U.S. Pat. No. 5,483,360, issued Jan. 9, 1996 to Rolleston et al.; U.S. Pat. No. 5,594,557, issued January 1997 to Rolleston et al.; U.S. Pat. No. 2,790,844 issued Apr. 30, 1957 to Neugebauer; U.S. Pat. No. 4,500,919, issued Feb. 19, 1985 to Schreiber U.S. Pat. No. 5,491,568, issued Feb. 13, 1996 to Wan; U.S. Pat. No. 5,481,380 to Bestmann, issued Jan. 2, 1996; U.S. Pat. No. 5,664,072. issued Sep. 2, 1997 to Ueda et al.; U.S. Pat. No. 5,544,258, issued Aug. 6, 1996 to Levien; and U.S. Pat. No. 5,881,209, filed Sep. 13, 1994 and issued Mar. 9, 1999 to Michael Stokes.

A specific feature of the specific embodiment disclosed herein is to provide a color analysis method in which sheets with multiple different color printed test patches are moved relative to a color analyzing spectrophotometer for analysis of respective said color test patches, and wherein fiducial marks are printed adjacent to respective said test patches to be optically detected by a fiducial mark detector to provide a fiducial mark triggering system for providing triggering signals from said fiducial marks for said analysis of said respective test patches, the improvement comprising the automatic diagnostic testing of said fiducial mark triggering system by automatically generating at least one special fiducial mark triggering system test sheet which is read by said fiducial mark detector.

Further specific features disclosed herein, individually or in combination, include those wherein said spectrophotometer is mounted in the paper path of a color printer and said special fiducial mark triggering system test sheet is printed by said color printer and fed through said paper path past said fiducial mark detector and/or wherein more than one said special fiducial mark triggering system test sheet is generated, and wherein at least one said special fiducial mark triggering system test sheet is printed with said test patches of varying density black and/or wherein more than one said special fiducial mark triggering system test sheet is generated, and wherein at least one said test sheet is printed with test patches of varying density black, and wherein then at least one additional said test sheet is printed with variable density black fiducial marks and/or wherein said variable density fiducial marks of said at least one additional said test sheet are printed with variable density data derived from said at least one said test sheet printed with test patches of varying density black and/or a color analysis method in which sheets with multiple different color printed test patches are moved relative to a color analyzing spectrophotometer for analysis of respective said color test patches, and wherein fiducial marks are printed adjacent to respective said test patches to be optically detected by a fiducial mark detector to provide a fiducial mark triggering system for providing triggering signals from said fiducial marks for said analysis of said respective test patches, the improvement comprising the automatic diagnostic testing sequence of said spectrophotometer and said fiducial mark triggering system by automatically generating a sequence of different test sheets of different printed optical densities which are read by said fiducial mark detector and said spectrophotometer and/or wherein said spectrophotometer is mounted in the paper path of a color printer and said sequence of different test sheets is printed by said color printer and fed through said paper path past said spectrophotometer to be read by said spectrophotometer and said fiducial mark detector and/or wherein said sequence of different test sheets includes both minimum and maximum density printed said test sheets and/or wherein at least one said test sheet is printed with different test patches of varying density black and/or wherein at least one said test sheet is printed with a single large test patch of maximum density black and/or wherein said spectrophotometer is mounted in the paper path of a color printer and said sequence of different test sheets is printed by said color printer and fed through said paper path past said spectrophotometer to be read by said spectrophotometer and said fiducial mark detector, and wherein said diagnostic sequence of different test sheets includes a minimum print density full scale output test, a maximum print density minimum scale output test, a patch centering test and a grey scale output test, and fiducial mark detector testing and/or wherein at least one additional diagnostic routine is automatically initiated in response to detecting a failure in said automatic diagnostic testing sequence and/or wherein at least one said test sheet is printed with a single large test patch that is imprinted.

The disclosed system may be connected, operated and controlled by appropriate operation of conventional control systems. It is well known and preferable to program and execute various control functions and logic with software instructions for conventional or general purpose microprocessors, as taught by numerous prior patents and commercial products. Such programming or software may of course vary depending on the particular functions, software type, and microprocessor or other computer system utilized, but will be available to, or readily programmable without undue experimentation from functional descriptions, such as those provided herein, and/or prior knowledge of functions which are conventional, together with general knowledge in the software and computer arts. Alternatively, the disclosed control system or method may be implemented partially or fully in hardware, using standard logic circuits or single chip VLSI designs.

In the description herein, the term "sheet" refers to a usually flimsy (non-rigid) physical sheet of paper, plastic, or other suitable physical substrate or print media for images, whether precut or web fed. A "copy sheet" may be abbreviated as a "copy," or called a "hardcopy." Printed sheets may be referred to as the "output." A "print job" is normally a set of related printed sheets, usually one or more collated copy sets copied from a one or more original document sheets or electronic document page images, from a particular user, or otherwise related.

As to specific components of the subject apparatus, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background. What is well known to those skilled in the art need not be described here.

Various of the above-mentioned and further features and advantages will be apparent from the specific apparatus and its operation described in the example below, and the claims. Thus, the present invention will be better understood from this description of a specific embodiment, including the drawing figures (approximately to scale, except for schematics) wherein:

Figure 1:
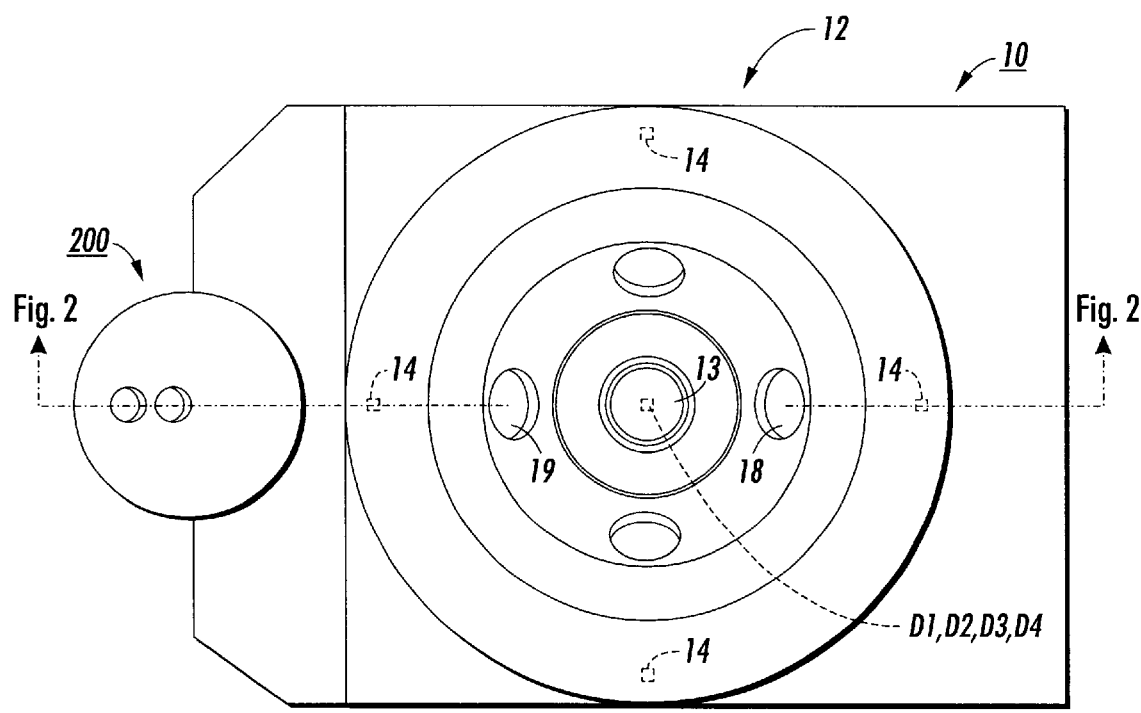
FIG. 1 is a top view of one example or embodiment of a spectrophotometer also incorporating one example of a fiducial marks detection system.
Figure 2:
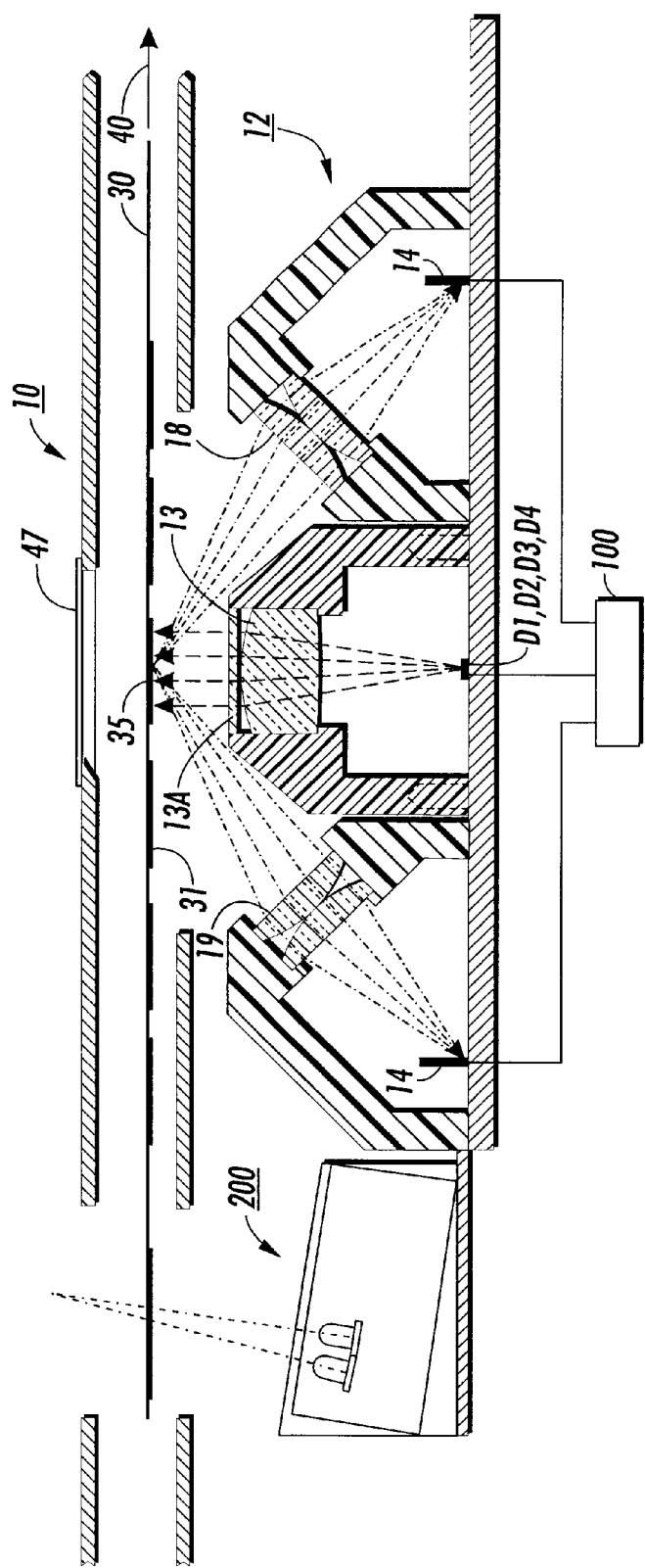
FIG. 2 is a cross-sectional view taken along the line 2—2 of the spectrophotometer of FIG. 1 shown measuring a test patch of a test sheet moving in an exemplary color printer output path.
Figure 3:
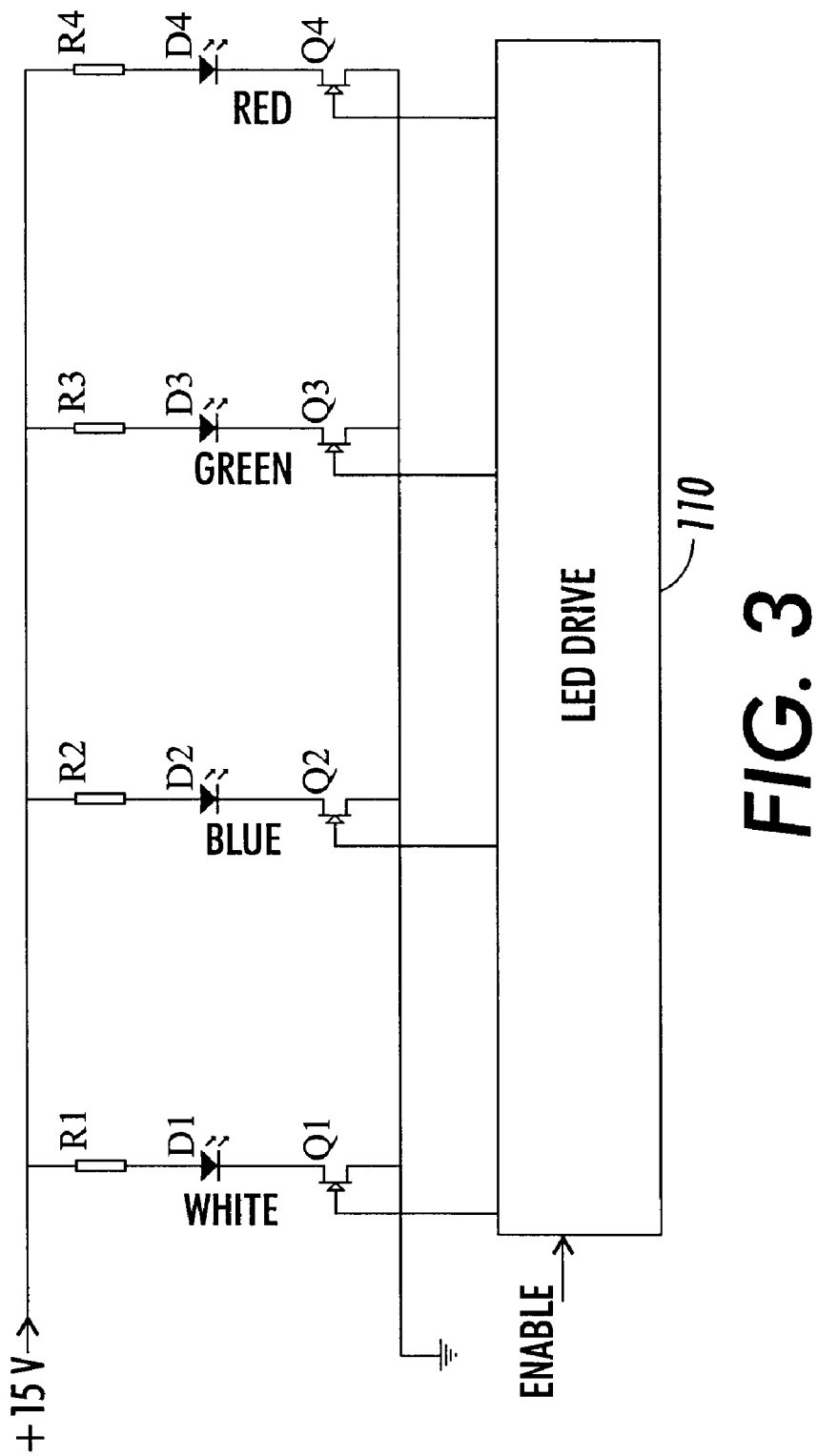
Figure 4:
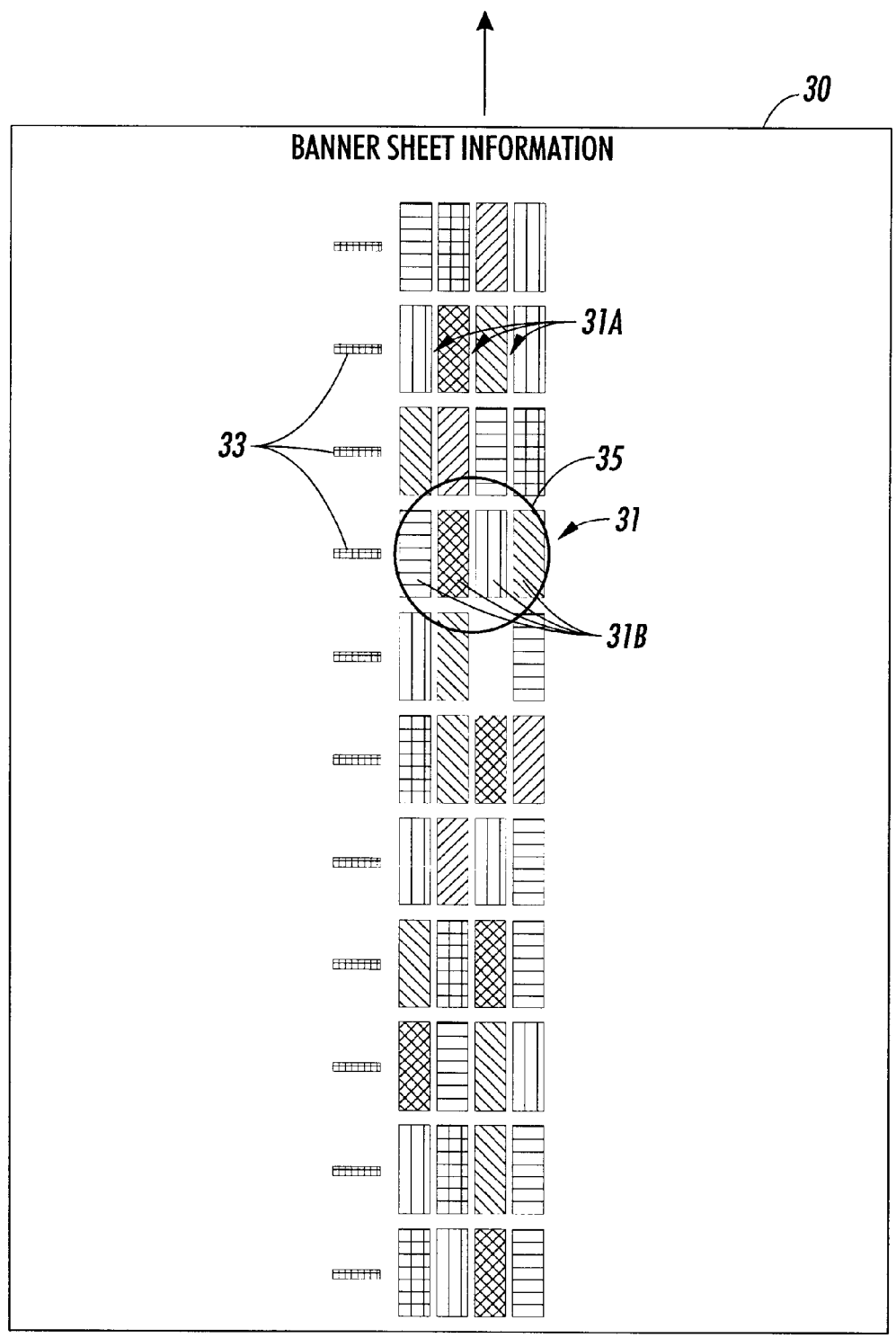
Figure 5:
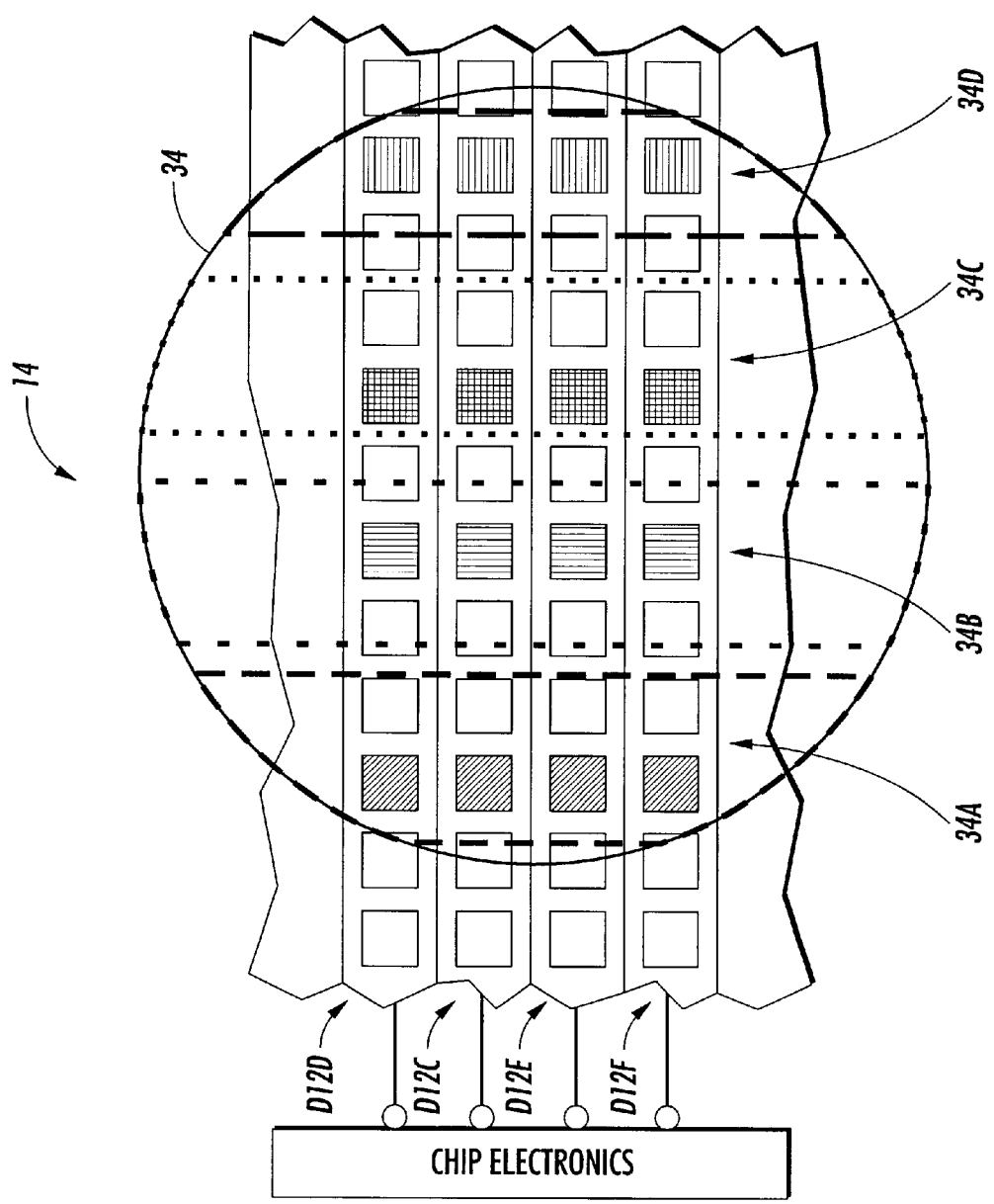
Figure 6:
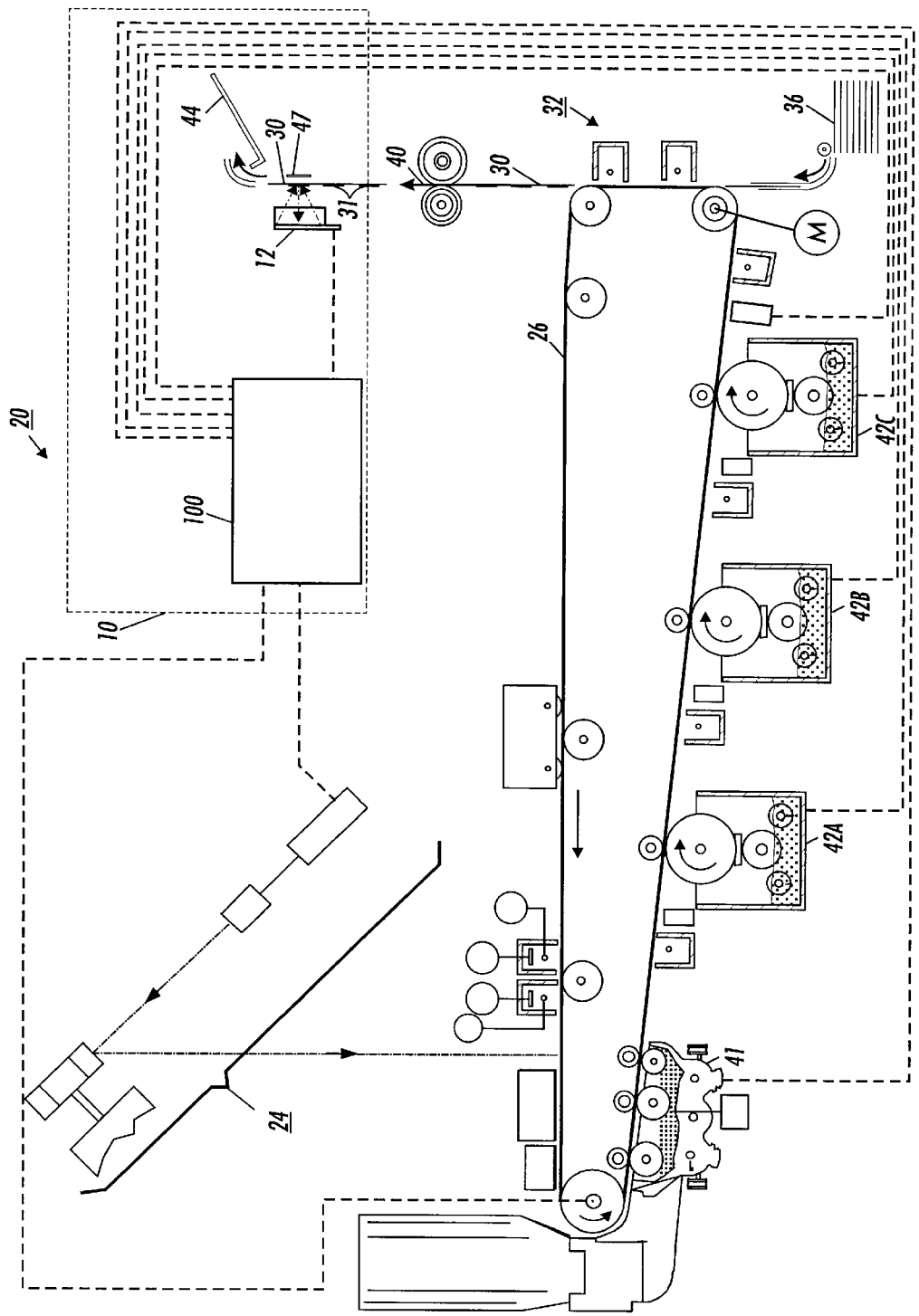
Figure 7:
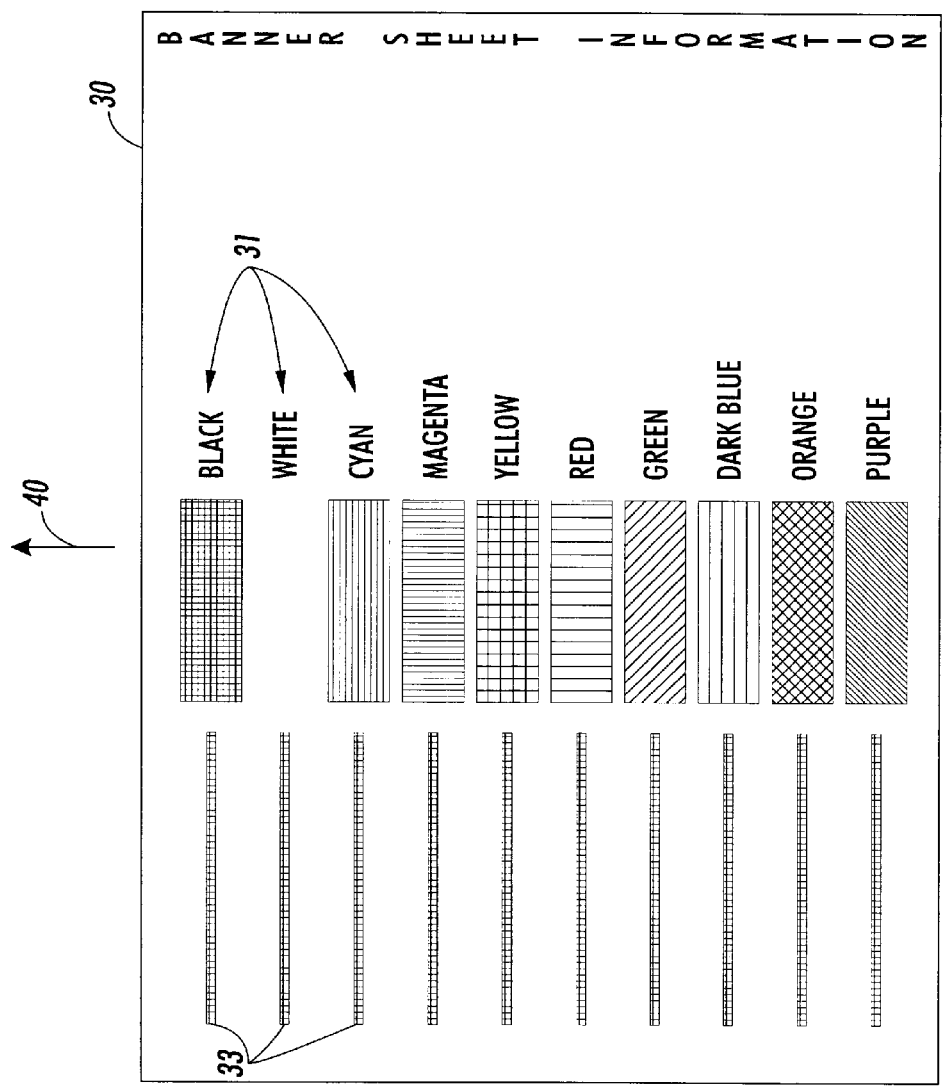
Figure 8:
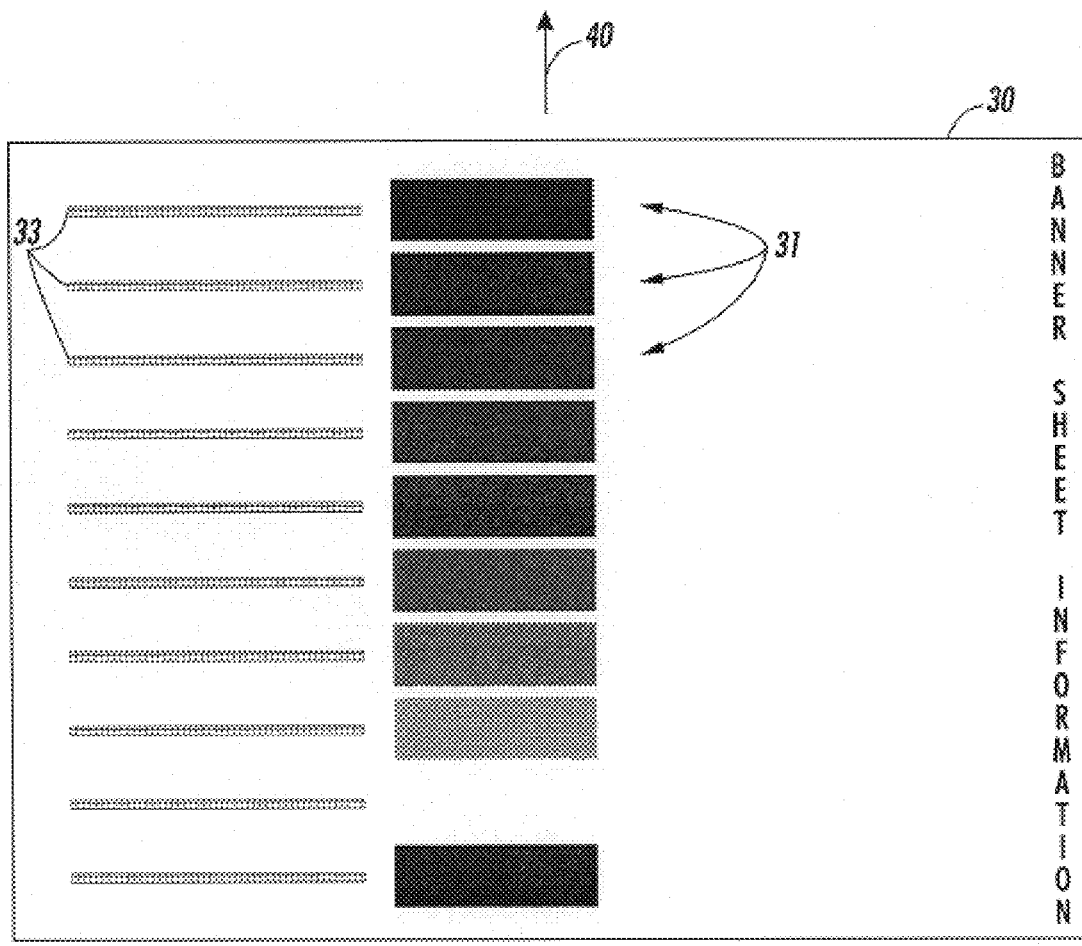
Figure 9:
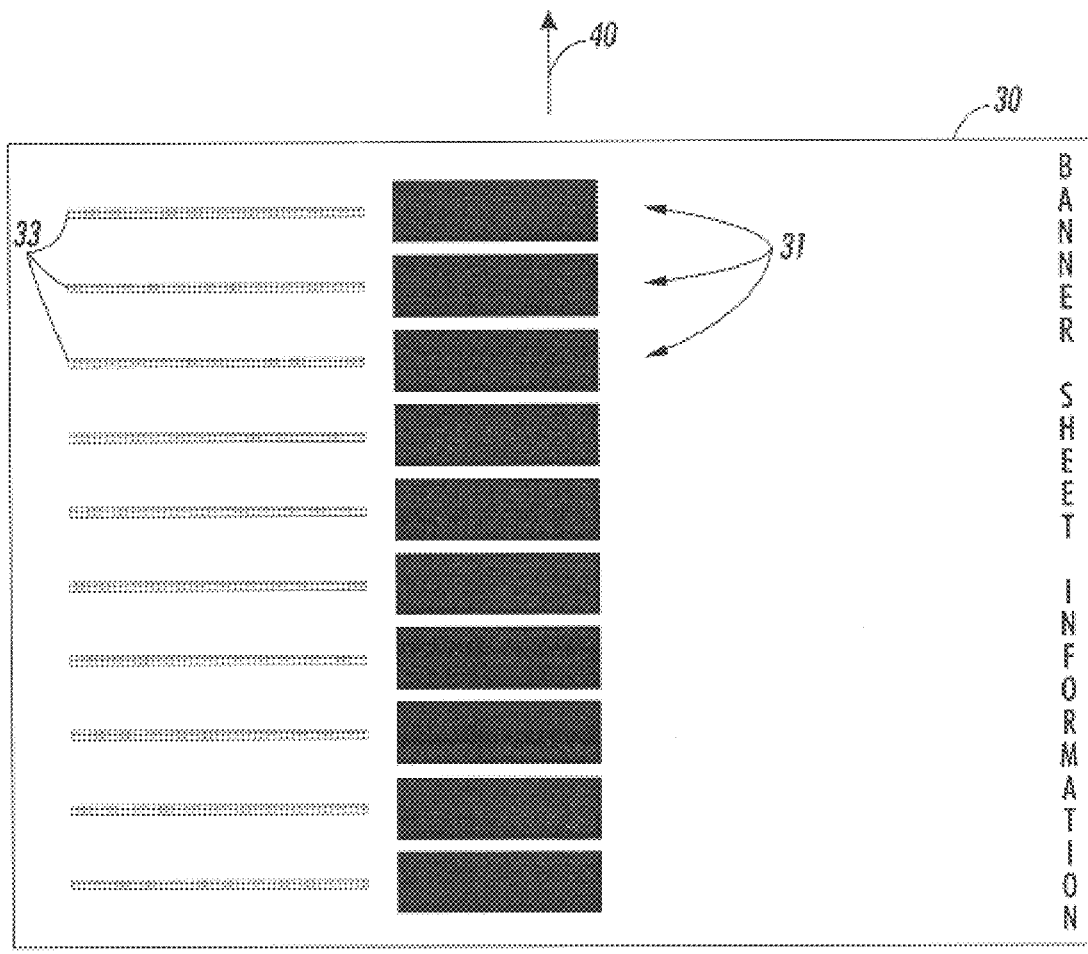
Figure 10:
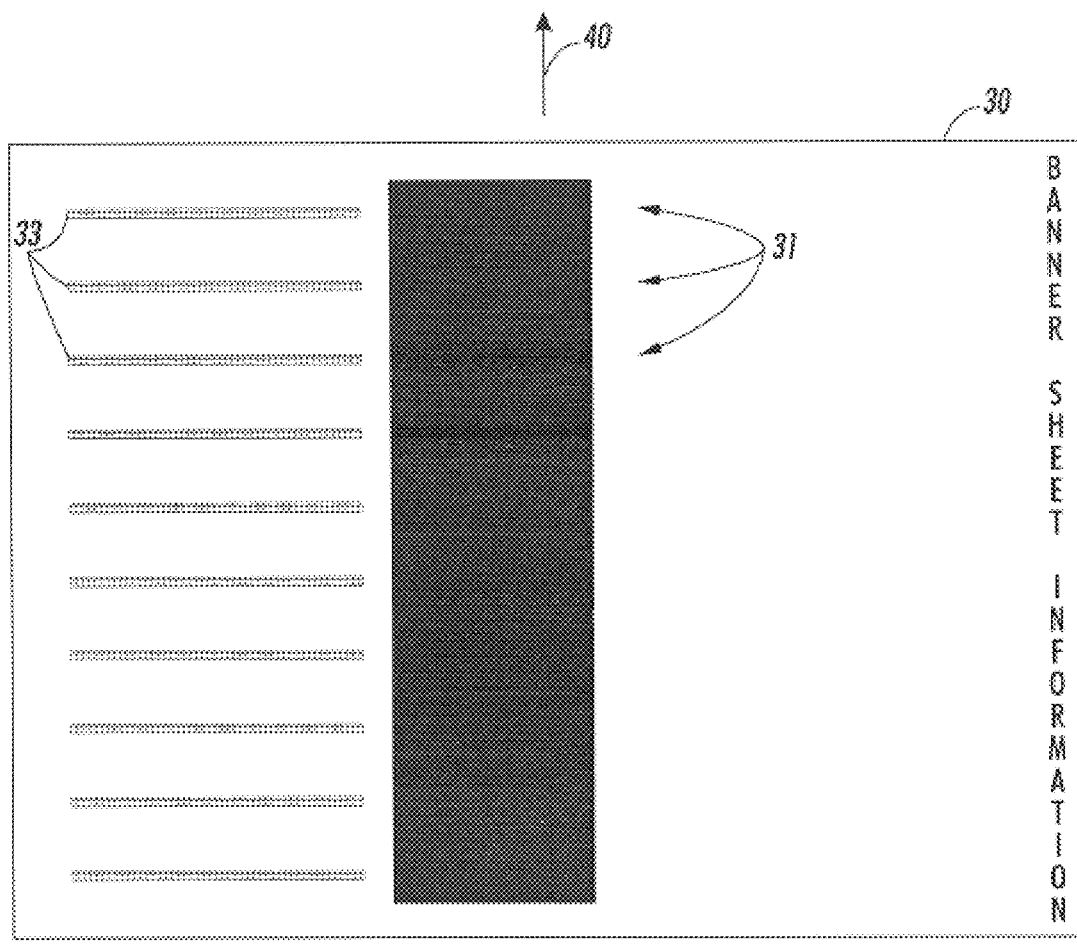
Figure 11:
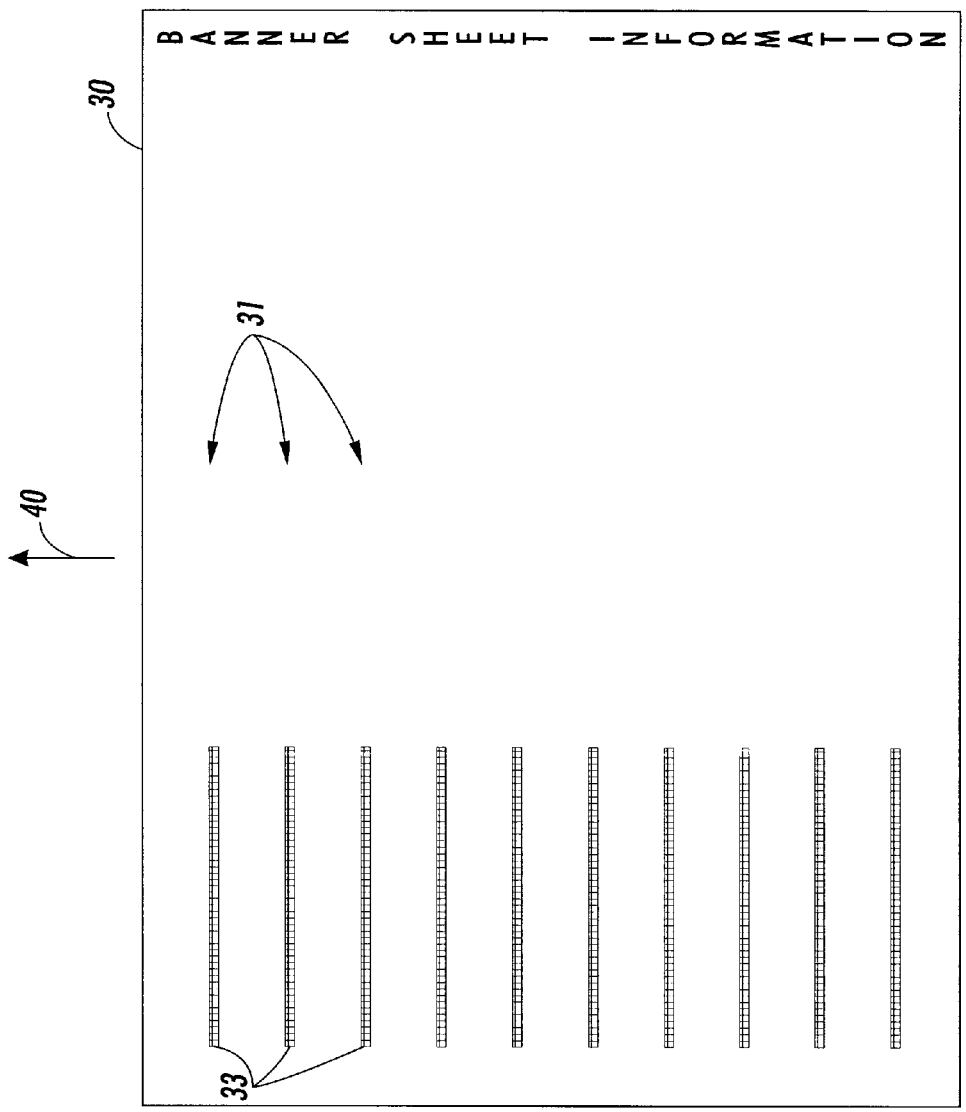

FIG. 3 schematically shows one example of driver circuitry with which the LEDs of the exemplary spectrophotometer of FIGS. 1 and 2, (or additional LEDs) may be sequentially operated;

FIG. 4 shows one example of a banner or other test sheet, which may be printed by an exemplary color printer, with plural color test patches (enlarged and not to scale here) being read by the spectrophotometer of FIGS. 1 and 2, with the different colors represented by their U.S. Patent Office standard black and white cross-hatching symbols, and with the area defined by the illustrated circle representing an exemplary illuminated test target area of a plural colors test patch which is being simultaneously illuminated by an LED light source;

FIG. 5 is a schematic and greatly enlarged partial plan view of an exemplary silicon color image sensor array chip (preferably part of a commercially available document imaging bar) which may be utilized in the exemplary spectrophotometer of FIGS. 1 and 2, with three rows of photosensor sites transmissively filtered red, green and blue, respectively, in a known manner, for respectively sensing spectra in those three separate colors, and also showing an (optional) fourth row of photosensor sites without filters for white light sensing, and with the area defined by the circle illustrated thereon representing an exemplary area of this sensor array chip being illuminated by the illumination reflected from the illuminated test target area, and also shown here are plural separated phantom-line boxes (within that circular exposed area) showing the separated areas of multiple exposed photo-sites which are seeing the separate images of the separate (but simultaneously exposed) different color areas of the exposed area of the test patch of FIG. 4;

FIG. 6 schematically shows in a plan view one example of an otherwise conventional color printer, shown printing the test sheets of FIGS. 4 and/or 7–11 and sequentially reading those test sheets with the spectrophotometer of FIGS. 1 and 2 as the test sheet are moving normally in the normal output path of this printer, with the spectrophotometer shown here mounted at one side of that sheet output path opposite from an opposing calibration test target surface;

FIG. 7 shows a test sheet with another example of a xerographically printed test pattern, here consisting of multiple solid area patches of different colors, each with an associated dark fiducial mark. This arrangement of color test patches and fiducial marks has also been disclosed in some of the above cross-referenced applications, and will be discussed in connection with the exemplary diagnostics systems disclosed herein along with the test sheets of FIGS. 8–11, all of which may be printed on white paper sheets;

FIG. 8 is an exemplary test sheet similar to the example of FIG. 7 but with monochromatic patches of variable density or grey scale (from maximum or full density black to very light and/or zero density (white for white paper) (except for one last black patch, in this example) and with the same associated fiducial marks;

FIG. 9 is a test sheet similar to the examples of FIGS. 7 and 8, but all of the test patches being printed in maximum density black;

FIG. 10 is a test sheet similar to the examples of FIGS. 7, 8 and 9, but with a single large unseparated test patch being printed in maximum density black in the area of the sheet normally printed with said multiple test patches; and FIG. 11 is a test sheet similar to the examples of FIGS. 7, 8, 9 and 10, but with no (zero density) printed test patches, only the fiducial marks.

With reference to the Figs., disclosed in this embodiment is one example of a color measurement on-line sensing and control system 10 with a spectrophotometer 12 able to illuminate a test patch 31 or other target area, and separately detect and separately analyze (so as to provide separate output signals) those differently colored areas.

This specific exemplary spectrophotometer 12 embodiment (or alternatives thereof) is particularly suited to be part of a highly effective yet economical on-line or "real time" color printing color calibration or correction system, which can regularly measure the actual colors currently printed in test patch areas 31 by a color printer, such as 20 of FIG. 6, on test sheets such as sheet 30 of FIG. 4 or 30 of FIG. 7, with adjacent fiducial marks 33, to be detected by a fiducial mark optical sensor such as 200 providing spectrophotometer 12 triggering signals to a controller such as 100. The measured printed colors may then be compared to the intended or selected, or "true" colors of the electronic document images being inputted to the printer 20 for printing to provide a color control system 10. However, as noted above, the present system relates to diagnostics and not to the details of the disclosed spectrophotometer 12 or its use, and is not limited to that disclosed combination, application, utility or spectrophotometer design.

The fiducial marks 33 may be simultaneously printed on each printed test sheet 30 and used to trigger the sequential illumination of the LEDs (D1, D2, D3, D4 in the example of FIGS. 2 and 3) after the color patch area 31 to be measured associated with that fiducial mark 33 arrives in the spectrophotometer sensor(s) viewing area. Such fiducial marks can accurately trigger the illumination circuitry, such as that of FIG. 3, even if the velocity of the moving test sheet 30 varies or becomes unpredictable.

In the particular illustrated spectrophotometer 12 embodiment, only a few LEDs (e.g., only three or four, such as D1, D2, D3 and D4) of appropriate different color spectral emission outputs need be utilized to sequentially illuminate an area such as 35 of the exemplary color test patch targets on the exemplary test sheets as in FIG. 4. Also, in this particular spectrophotometer 12 the target reflected illumination level is not detected by a single photocell. Instead, it is detected by multiple spectral response photo-sites of a low cost color image sensor array chip 14, as in the example of FIG. 5, having rows of closely adjacent plural color sensors (photo-sites D12F, D12E, D12C and D12D) with respective plural different integral color filtering (none, blue, green and red) providing plural different spectral sensitivities, and plural parallel output signals, rather than a single output signal from an individual (single cell) photosensor. The respective different color output LEDs D1, D2, D3 and D4 may be switched on in a predetermined sequence (as shown in FIG. 3 or otherwise) to provide plural specific different spectral reflectance measurements within the visible wavelengths, The spectral measurements of a test target may be converted to provide a true broad reflectance spectra, through known or other reconstruction and extrapolation algorithms, as previously noted. Both the number and spectra of the LED illuminators and the photosensor sites (detectors) may be varied, as appropriate, and are not limited to the specific numbers and specific wavelengths of this specific example for purposes of the subject diagnostics.

It will be noted especially with respect to these descriptions of imaging chips, that the terms "photosensor sites," "photo-sites," "photosensitive cells," "cells," "detectors," or "sensors" are variously used interchangeably in descriptions herein, as in the art, unless otherwise indicated.

Turning now to some subject specific exemplary diagnostics tests with reference to the exemplary Figs.; interrogation of the operation of the spectrophotometer LEDs, the spectrophotometer sensor(s), and the fiducial marks sensor (where a separate fiducial marks sensor is part of the system) can be accomplished by printing and passing an appropriate set of test sheets with test patterns of selected or known density and patch locations on the already machine-loaded or available white print paper through the sensing nip of the spectrophotometer sensor(s). The output signal responses of the sensor(s) may then be recorded and compared to the expected response for that respective test. Significant deviations from the expected may be interpreted as malfunctions, and remedial actions may then be initiated, automatically or by diagnostic displays. For example, displaying an operator or tech rep instruction to clean, or replace, potentially contaminated or defective sensors or associated circuitry. Exemplary suitable different test sheets, their test patterns, and their function and/or method of use, are described herein, in connection with different exemplary diagnostic tests described as follows:

1. Zero Scale Output Test:

This test is with media absent, that is, prior to any test sheet or print job sheet passing the spectrophotometer or otherwise being in the field of view of the spectrophotometer sensor(s) sensing nip area. This may be at machine startups, machine cycle-downs, or even within the spaces in between printed sheets moving in the sheet path. The spectrophotometer LEDs may all be sequentially energized and a reading from the spectrophotometer sensor(s) sensing nip area made without any print media present. This may be done with an opposing non-reflective or black baffle area in the sensing area, or an opposing black test tile area such as 47 shown in FIG. 2. The output of all channels of the spectrophotometer sensor output should be near zero in this test. If there are 10 channels, and the zero point is near 0 Volts, then 10 signals of slightly greater than this minimum should be observed. That is because perhaps 20 to 40 mV or so might be expected from stray light or light leakage reflected from nearby machine components. This normalized zero level may be obtained during machine setup or initial installs as one of the tech rep setup procedures. If significantly higher signals than these anticipated or normalized values are observed during this "zero scale output test", (e.g., approximately 0.5 or more volts), then a fault may be declared and remedial action may be initiated.

2. Full Scale Output Test:

A test sheet such as 30 of FIG. 11, with pattern of no (zero density) test patches 31 in the normal test patch areas, but normal fiducial marks 33, is produced and fed to be read by the spectrophotometer 12. As shown, in this example of a test sheet 30E It has ten fiducial marks 33. Thus the anticipated spectrophotometer 12 response is ten trigger signals from the fiducial mark sensor 200, plus all the output readings from the spectrophotometer sensor(s) for all of the LEDs should be at least approximately 80% of their respective anticipated (e.g., previously tested) full scale output signal levels. If the test sheet media is certain papers especially made for improved color reprographics, or some other glassy white papers, then these readings may be higher, such as about 85% to 90% of full scale. That is because those papers may be more vigorously whitened by extra bleaching, cleaner constituents, kaolin, more optimal calendering, higher basis weight, or the like. If general purpose or dual-purpose paper is being employed as the test sheet media, then these spectrophotometer signal outputs from unprinted test patches should normally be about 76% to 81% of full scale.

If fewer or greater than 10 trigger signals are observed from the fiducial mark sensor 200 in this "full scale output test", i.e., more, or less, fiducial mark signals than the number of fiducial marks 33 printed on the test sheet 30E, then a fault condition is declared. Likewise, if any of the spectrophotometer sensor(s) readings from any of the LED actuations in this same "full scale output test" are significantly above 86% or below 76% of full scale, then a fault may also be declared from this test.

Remedial action in the case of a test failure outcome or mode in which fewer than 10 fiducial mark sensor 200 trigger signals are observed in the above (or other) fiducial mark sensor test may include automatic or tech rep initiation of other follow-on diagnostic routines. For example, generating and reading additional test sheets with increased and/or decreased width fiducial marks 33, in order to test for signal strength or proper modulation. Also, other test sheet fiducial mark patterns may be generated and read which have slightly different lateral or inboard/outboard positions of the fiducial marks on the test sheet, in order to test for proper alignment of the marks relative to the sensor and/or sheet path lateral sheet registration errors.

Note that on any test sheets providing optical density diagnostics testing, such as those of FIGS. 8–11, density identification numbers may be printed alongside the respective test patches (test target areas) to indicate the intended sensor output signal range or scale for the printed density being read which the diagnostics software had requested the printer to print in that particular test patch. For example, a "0" printed next to a maximally light test patch and "255" printed next to a maximally dark test patch.

3. Maximum Black Output and Lateral Positioning Test:

Next a test sheet 30 pattern consisting of the same fiducial marks and one large continuous maximum density test patch, printed with black toner, such as shown in FIG. 10, may be produced. Again, this test sheet 30 is read by the spectrophotometer sensor(s) for all of the respective LED illuminations. The anticipated response to this test sheet 30 is 10 trigger signals from the fiducial mark sensor 200 and that all sensor readings from the LEDs should be only approximately 1 to 5% of full scale, assuming proper black density printing capability of the printer in its then existing condition. Since the entire patch (all possible test patch areas) is black, all channels of the spectrophotometer should be nearly equally low. As in the case of the above test, if 10 fiducial mark sensor trigger signals are not observed, a fault is declared. Likewise, if spectrophotometer sensor(s) readings significantly differing from 1 to 5% of full scale are observed, a fault is declared, and remedial actions may be initiated. The latter fault may be caused by lateral misalignment of the sensor and the patch, and one of the remedial actions may be to move the printing position of the printed test pattern in order to center it in the spectrophotometer sensing nip.

4. Patch Centering Test:

Next a test sheet 30 with a pattern of discrete maximum density test patches, also using black toner, such as shown in FIG. 9, may be produced and read by the spectrophotometer. The anticipated response for this test sheet 30 is the same 10 trigger signals from the fiducial mark sensor and the same spectrophotometer sensor(s) readings from all of the LED illuminations of about 1 to 5% of full scale, for the same printer condition. The same fault conditions may be declared. However, in this test, if the illuminated viewing area of the spectrophotometer sensor optics is not entirely within a designated patch area, as triggered by the associated fiducial mark position and the fiducial mark sensor position, the spectrophotometer sensor readings may be taken partially on the intended patch and partially in the untoned area between test patches, giving a defective (higher) reading. The remedial action in this case may be to automatically software adjust the relative printing locations of the fiducial marks and/or patches, so that the field of view of the sensor includes only the patch area.

5. Gray Scale Output Test:

Next a test sheet 30 as in FIG. 8 with a sequentially varying gray scale pattern of patches using black toner may be produced and read by the spectrophotometer. The anticipated response is still 10 trigger signals from the fiducial mark sensor. Also, the normalized readings from the spectrophotometer sensor(s) should be approximately equal for all of the LED channels for each test patch. However, for each progressively lighter density test patch the sensor outputs should increase, starting at the same approximately 1 to 5% of full scale and increasing monotonically to around 75 to 85% of full scale output. Significant departures from this expected behavior would cause a fault to be declared.

6. Colored Patch Response:

The last test sheet 30A pattern employed in this particular exemplary diagnostic series tests the different LEDs response to various colored patches. One of various possible said prints is shown in FIG. 7. The first two test patch areas are respectively black and white, and the remainder of the test patches are variously colored, as shown. The spectrophotometer responses to these respective test patches are compared to those expected, and if the deviations are excessive, a fault is declared and remedial actions may be initiated. This assumes that the system has been well color calibrated, at least for these colored patches. If it was not calibrated, then before using these colored patches in this test, it is important that the printing system be brought at least into a condition to produce those desired test colors to within some degree of tolerance. (Machine color calibration is described in various references cited herein and need not be redescribed here.)

It may be seen that the above diagnostic tests provide a relatively simple technique for automatically interrogating the operating characteristics of an in-machine color spectrophotometer. It enables the machine to detect marginal or erroneous measuring conditions, and to flag this situation for service, and/or to take corrective actions to fix the problem, automatically or otherwise.

Although this has described for diagnosis of a color spectrophotometer, as noted, it could also be used for a colorimeter, which uses only three light sources and can therefore be considered a defeatured, lower accuracy, and lower cost spectrophotometer. Thus, as noted, in the claims herein, unless indicated otherwise, the term spectrophotometer is intended to encompass colorimeters.

Additional diagnostics will now be described for the interrogation of potential malfunctions in the fiducial mark sensing system comprising the xerographically produced fiducial marks and the optical fiducial mark sensor such as 200. As noted, this fiducial mark sensing system may be desirably used to more accurately trigger the occurrence of a desired event, such as the indicating arrival and correct positioning in the movement direction of a test patch of a test pattern on a moving test sheet for correct color measurement of that test patch by a color spectrophotometer. The following diagnostics system here is to provide assurance that the fiducial mark triggering system is sufficiently robust for such reliable color data collection. A reliable fiducial mark sensing triggering system has been found to be especially useful for in-situ spectrophotometers measuring color at high speed on paper sheets moving at somewhat variable sheet feeding speeds. A significant challenge in implementing a multiply sequentially illuminated LEDs color sensor in a reprographic machine is reliably reading the test patches on print media passing by the sensing zone in real time. It has been found desirable to provide triggering of the LEDs by a simple reflective fiducial mark sensor such as 200 attached to the side of the LED spectrophotometer, which changes its output state from low to high (e.g., ~0.2V to 4.8V) when a black mark imprinted alongside each test patch passes through its sensing area.

The following exemplary disclosed diagnostics involve generating a series of solid area test patches of varying optical density, preferably black in color, on a test sheet, such as 30 of FIG. 8, which are read by the spectrophotometer. These readings are used to determine the relative diffuse reflectivity of the patches. These test patch measurements may be used to linearize the system by producing inverted tone reproduction curves. This same density set as was printed in the normal test patch areas may then be printed at the normal fiducial mark locations, starting from the darkest and proceeding to the lightest. Before printing these variable density patches at the fiducial mark locations, they may be processed through the new tone reproduction curves to ensure linearity. A count of the number of successful fiducial mark sensor triggering events from those variable density test areas thus gives a measure of how close the fiducial mark sensing system is to failing to read its intended maximally black mark. Note that this type of self diagnosis of the fiducial mark sensing system assumes that the spectrophotometer optics are operating normally, and That the printer is operating to print black properly, which can be tested by other diagnostics described herein or elsewhere.

Since the test sheets and their fiducial marks are preferably produced xerographically, as needed, in the same printing machine, it is possible that due to variations in the xerographic printing process with time and/or machine or toner material state changes, the optical density of the fiducial marks may decrease (become lighter) so that triggering does not occur, or become sporadic. Alternatively, it is possible that the unwanted toner development or other contamination in the spaces between the fiducial marks may occur, or the perceived width of the marks might increase to the point where once triggered by the arrival of the first fiducial mark, the sensor fails to become untriggered. Since this would cause color test patch measurement errors, it is desirable to be able to predict the onset of any such unreliable fiducial mark triggering, as well as the current condition of robustness of the fiducial mark optical detection system, which itself may become contaminated.

As with the other exemplary diagnostics systems embodiments above, it is shown here how this diagnostics may be done with no additional hardware, and thus no significant additional cost, and may even be automatically initiated by the machine software as part of a self-checkup diagnostics routine, and/or initiated by the machine operator or a tech rep, on-site or by remote network, telephone or wireless diagnostics or diagnostics initiations.

Interrogation of the robustness of the fiducial mark detection may be accomplished as follows. First a pattern of test patches such as are shown in FIG. 8, ranging from 100% area coverage to near 0% area coverage is produced, with the associated fiducial marks printed at 100% area coverage (maximum toner density) to assure maximally reliable fiducial sensor triggering. It is assumed in this description that black is used to print the fiducial marks, and thus the respective test patches are printed from maximally black gradually toning through dark gray and then light gray. However if the fiducial marks were printed in another color, the patches displayed in FIG. 8 could be printed in that color.

The optical density of these patches is read by the spectrophotometer, and this establishes a relationship between the print density code sent to the printer by the diagnostics software and the actual printed output. For example, a code of 256 might tell the printer to attempt to print a 100% area coverage patch, a code of 128 a 50% coverage, and a code of 000 a 0% coverage. The spectrophotometer reads this set of patches and from these measurements a table can be constructed detailing the relationship between desired density and the actually printed (measured) density. The measured density may be obtained by converting the spectrophotometer output to optical density using the following expression:

$$\text{Optical density} = \log_{10} \frac{\sum_{i=1}^{M} \int L_i(\lambda) D(\lambda) d\lambda}{\sum_{i=1}^{M} \int L_i(\lambda) R(\lambda) D(\lambda) d\lambda}$$

The above numerator defines the spectral response of the sensing system and the denominator defines the spectral response of the sensing system with the substrate density under measurement. $L(\lambda)$ is the spectral output of the LEDs, M is the number of LEDs in the spectrophotometer, $D(\lambda)$ is the detector spectral response of the spectrophotometer and $R(\lambda)$ is the reflectance spectra of the test patches as measured.

The respective optical densities are then used to construct the tone reproduction curve between the 0 to 100% toner area coverage of the printing system. The tone reproduction curve (TRC) may then be inverted around a 45 degree reference line to linearize the subsequent printing of fiducial mark patches for use in self-diagnosing a possible fault. That inversion is a standard process. An inverted TRC is required only for black, if black separation is used to make the fiducial marks on the paper.

Then the area coverages used for the desired density may be processed through the inverted TRCs and then applied to print the fiducial marks in corresponding varying density. A test sheet thereof is printed and as it is fed by the fiducial mark sensor the number of successful reads is recorded. Since the true optical density of the fiducial mark patches is now known from the measurements taken previously, the true optical density of a fiducial mark at which detection fails to occur is therefore known and the latitude for successful fiducial mark sensor 200 triggering can be inferred.

As an example, assume the test pattern contains 10 test patches and 10 associated fiducial marks, as shown. Hypothetically, let the results of the spectrophotometer LEDs measurements of the grayscale pattern of FIG. 8 be given in the following Table. The expected reflectivity of the grey scale test patches is obtained from previously determined developability characteristics of the printer. That may be modified somewhat if desired by measuring the reflectivity of the particular media paper on which the patches are to be printed and adjusting the referenced values to account for the difference in substrate reflectivity. The exemplary results displayed in this Table would be consistent with a linear relationship between input and output, with a printer behaving close to expectations.

TABLE

| Patch # | Bit Count | Expected Reflectivity (%) | Measured Reflectivity (%) |
| --- | --- | --- | --- |
| 1 | 256 | 2 | 4 |
| 2 | 231 | 11 | 14 |
| 3 | 206 | 20 | 23 |
| 4 | 181 | 29 | 32 |
| 5 | 156 | 38 | 41 |
| 6 | 131 | 47 | 49 |
| 7 | 106 | 56 | 54 |
| 8 | 81 | 65 | 64 |
| 9 | 56 | 74 | 73 |
| 10 | 31 | 83 | 81 |

Continuing this example, if now the grayscale results of the test pattern of FIG. 8 are applied to the fiducial marks of a subsequent test sheet, after processing through the inverted TRC, and that second test sheet with its grey scale range of fiducial marks is passed through the fiducial marks detector 200 sensing nip, and the number of successful trigger events is counted, then the fiducial marks detector triggering latitude can be determined. For instance if 8 (instead of all 10) triggering events are counted, then it may be deduced that the developability could degrade at least 62% (98% absorbtivity to 35% absorbtivity) without affecting the operation of the fiducial marks sensor 200. Alternatively, if only two triggering events were counted, then a fiducial mark darkness degradation of less than 18% would affect the sensor's operation. In the first instance, continued normal operation of the spectrophotometer would be permitted, and in the second, some corrective action would normally be taken to rectify the situation.

As with other spectrophotometer diagnostics routines herein, such automatically actuated corrective actions may include, but are not limited to, known diagnostics software and GUI (graphic user interface) displays signaling for specific service, or automatically increasing the printers developability of the fiducial marks, or even temporarily switching the printer to run in a "limp mode" with an open loop (no spectrophotometer color correction feedback) operation.

The above technique for measuring the operating robustness of a digital signal producing mark-on-paper sensor in reading its intended triggering fiducial mark may be done automatically without using an oscilloscope or other diagnostic instruments in the field. It enables the system to detect marginal triggering conditions, and to flag that situation for service or other corrective action.

Further by way of background as to alternative embodiments, the exemplary test sheet 30 color test patches layout shown in FIG. 4 is a modification of the normal line of relatively large and spaced apart one-color test patches extending in the movement direction of the test sheet relative to the spectrophotometer, as shown for example in various of the above cross-referenced applications or cited references and in FIG. 7. As shown in FIG. 4, each (normal large single color) test patch area 31 may be modified to contain small multiple different color sub test patch areas 31B. As shown, these test patches 31B may comprise thin laterally spaced columns of different colors, closely enough spaced together so that at least several such different color test areas are within the exemplary illumination and viewing area 35 of the spectrophotometer 12. Appropriately small unprinted spaces providing separations 31A may be provided as shown between these respective columns of different test patches 31B to provide distinctive separations between these individual color areas 31B. Alternatively, or additionally, printed boundaries may be used as such separators. The separations 31A also insure that the printer will not overlap the printing of the edges with two different adjacently printed colors. However, if the colors of even directly adjacent patches 31B are sufficiently different, such separations or boundaries may not be required for the spectrophotometer 12 multiple photo-sites imager chip 14 and its connecting software to discriminate between the respective test patches and also to electronically delete and ignore the edge areas of the patches 31B.

Note that the substantially real time data from any of the test patch color measurements by these or any spectrophotometer may be buffered and analyzed in batches of preset or limited numbers of test patch data measurements, if desired.

The area 35 defined by the circle in FIG. 4 illustrates an exemplary test target illumination and viewing area of this particular spectrophotometer 12 when any of these LEDs D1, D2, D3, D4 are turned on. This illumination by the LEDs is reflected and collected on the photo-sites of the chip(s) 14 through sensor optics, preferably approximately 1:1 optics, which are relatively insensitive to spatial and angular variations of the test sheet 30 surface, as further described in the above cross-referenced applications.

FIG. 5 shows schematically, with respective exemplary phantom outlined areas 34A, 34B, 34C, 34D within that chip 14 exposed area 34, the respective image areas of respective different patch-column color areas 31B of FIG. 4. These respective different color patch areas 31B are falling on different respective column shaped areas (such as 34A, 34B, 34C, 34D) of multiple photo-sites of the chip 14. Each such separate test patch area 31B has a separate image area 34A, 34B, etc. exposing a large number of cells in all of the three (or four) the differently color-filtered rows D12D through D12F. Thus, each individual color test area image may be separately analyzed by the different signals from different area sets of differently color-filtered cell.

The processing electronics may readily identify those patch boundaries from their distinct chip 14 cell outputs, and/or subtract cell data from adjacent the edges of these multi-pixel image areas. That can be done in addition to thresholding out low-level signal data from only partially exposed cells at the edges of exposed areas. Desirably the electronics will average the large number of exposed pixels within each row D12C–D12F of pixels within each color patch 31B image area 34A, 34B, 34C, etc., to provide a more robust measurement.

Any or all of the outputs of the sensor chip 14 may, of course, be calibrated/reconstructed to provide true reflectance values. For example, as in U.S. application Ser. No. 09/562,072, filed May 1, 2000 by Lingappa K. Mestha, et al., entitled "System and Method for Reconstruction of Spectral Curves, Using Measurements from a Color Sensor and Statistical Techniques," now U.S. Pat. No. 6,449,045 issued Sep. 10, 2002, Attorney Docket No. D/99803.

An alternative application, function, or option is to turn on, and leave on, only a white illumination source, for all of the color test patches being read at that time, to provide a "colorimeter" function of RGB values from the chip 14 outputs.

Briefly first describing the exemplary color printer 20 of FIG. 6 in more detail, it is schematically illustrating an otherwise conventional xerographic laser color printer, details of various of which will be well known to those skilled in that art and need not be re-described in detail herein. Examples of further descriptions are in the above-cited Xerox Corp. U.S. Pat. No. 5,748,221, etc., and other art cited therein. A photoreceptor belt 26 is driven by a motor M and laser latent imaged or exposed by a ROS polygon scanning system 24 after charging (or an LED bar). The respective images are developed by a black toner image developer station 41 and/or one or more of three different color toner image developer stations 42A, 42B, 42C. The toner images are transferred at a transfer station 32 to sheets of copy paper fed from an input tray stack 36. Where one or more test sheets 30 are being printed instead of normal document images (at times, and with color tests, selected by the controller 100), each such test sheet 30 may be fed from the same or another sheet supply stack 36 and its test images transferred in the normal manner. The test sheet 30 is then outputted through the fuser to the same normal output path 40, as if it were any other normal sheet being normally color printed. The test sheets 30 may be dual mode sheets also serving as banner sheets for print job separations, with typical printed banner sheet information, such as one or more of the user's name, the document title, the date and time, or the like.

The spectrophotometer 12 here is mounted at one side of that output path 40 (or, it could even be mounted over the output tray 44) to sense the actual, fused, final colors being printed. The spectrophotometer output signals provide the input for the on-line color sensing and correction system 10, here with a microprocessor controller 100 and/or interactive circuitry and/or software. The controller 100, and sheet sensors along the machine 20 paper path, conventionally controls the feeding and tracking of sheet positions within the printer paper path. The controller 100 and the sensor 200 for fiduciary marks 33 or the like on the test sheet 30 can provide control or actuation signals to the spectrophotometer 12 circuitry for the spectrophotometer 12 to sequentially test or read the colors of each of the test patches 31 on the test sheet 30 as that test sheet 30 moves past the spectrophotometer 12 in the output path 40. The test patches 31 can be variously located and configured, as blocks, strips, or otherwise, of various digitally selected solid color images.

Thus, in the disclosed embodiment, plural test sheets 30 of paper or other image substrate material being printed by the color printer 20 can be automatically printed with pre-programmed plural test patches 31 of one or more defined colors, preferably with associated simple fiduciary marks for signaling the reading location of each colored test patch on the test sheet. Each test sheet 30 moves normally past the fixed position spectrophotometer 12, which is unobstructedly mounted at one side of the normal post-fuser machine output path 40 to both illuminate and view sheets passing thereby. This is in contrast to those prior systems requiring removing and holding a test sheet still, and moving a standard contact colorimeter or spectrophotometer over the test sheet.

It will be seen in FIGS. 1 and 2 that the exemplary compact spectrophotometer 12 shown in that example has only four different color sampling illumination sources, provided by four commonly target-aimed but sequentially operated LEDs, D1 through D4, each with different color spectrum radiant outputs. Each LED output may have the same simple condenser lens, such as 13 in FIG. 2, for directing the light from the respective LED onto the same test target area, as shown by the illuminated area 35 of FIG. 4. Color filters 13A for the LEDs may be provided in some cases if desired to further control the spectral range. The normal target area in the system 10 embodiment herein is an area of a printed color test patch or patches 31 on a sheet of paper 30 being otherwise normally printed and outputted. An alternate or calibration target area could be an unprinted area of the test paper sheet, or a white, grey, black or other color standardized test tile or surface such as 47 automatically solenoid (or manually) inserted into the effective field of view of the spectrophotometer 12 when not blocked by a sheet 30.

As particularly shown in FIG. 2, the test target illumination by any one of the LEDs provides a variable level of light reflected from that target depending on the colors of the test patch and the selected illumination source. A portion of that reflected light may collected by a lens system such as 18 or 19 and focused by that lens system onto single photosensor chip 14 to expose, in this example, an array of multiple photo-sites having 3 or 4 different colors of filtering, as shown in FIG. 5 and described herein. FIG. 2 illustrates, with dashed line light rays, both said LED illumination and the focusing by the lens system (a simple two-element optic in this 18 or 19 example) onto the chip 14 surface.

Although conventional glass or plastic lenses are illustrated, it will be appreciated that fiber optics or selfoc lenses could be utilized instead in other applications. Fiber optics may be used to conduct the illumination from the LEDs. Also, a collecting fiber optic may be used if it is desired, for example, to space the detecting photosensor array remotely.

As utilized in this disclosed embodiment of an on-line color sensing system 10, this low cost spectrophotometer 12, as mounted in the printer 20 copy sheet output path 40, can thus be part of a color correction system to automatically control and drive to color printing accuracy the printer 20 CMYK color generation with a small number of printed test sheets 30. The color correction system can sequentially look at a relatively small series of color test patterns printed on copy sheets as they are outputted. One or more mathematical techniques for color error correction with multiple spectrophotometer-detected output color signals for each color patch as input signals can provide for a greatly reduced number of required printed test patches, as shown in the above-cited references. That is, by recording the detector array multiple outputs when a test patch is successively illuminated by each individual LED, the reflectance of the test patch as a function of different wavelengths can be determined, and that reflectance of the test patch, as a function of different wavelengths, can be extrapolated or interpolated over the entire visible spectra.

An accurate color control system, as disclosed herein, can thus regularly or almost constantly provide for testing and storing current machine color printing responses to color printing input signals (an up-to-date model) for remapping LAB (or XYZ) "device independent" color inputs (for later conversion to device dependent RGB or CMYK color space for printing). That information can also be profiled into a system or network server for each different machine (and/or displayed on a CRT controller for color manipulation).

As shown and described in the above-cross-referenced applications, as a components-reversal alternative to the spectrophotometer embodiment 12 of FIGS. 1 and 2, the test patch 31 illuminations may be at 45 degrees to the surface of the media on which the color test patch is printed, and the sensing system may be detecting flux diffusely scattered from the (so-illuminated) test patch at 90 degrees (perpendicular to) that same color test patch surface. In that alternative configuration a single central axis mounted chip 14 may be used.

FIG. 3 is a schematic or block diagram of an exemplary LED driver for the spectrophotometer 12 of FIGS. 1 and 2, portions of which may be part of the controller 100, even though it can be, in whole or in part, a separate circuit, desirably having a single driver chip or die for all of the LEDs in the spectrophotometer itself. In response to regular timing signals from the circuit 110 labeled "LED Drive" here, each LED is pulsed in turn by briefly turning on its respective transistor driver Q1 through Q4, by which the respective different spectra LEDs D1 through D4 are turned on by current from the indicated common voltage supply through respective resistors R1 through R4. Four different exemplary light output colors of the four respective LEDs are indicated in FIG. 3 by the legends next to each of those LEDs. Thus, each LED may be sequenced one at a time to sequentially transmit light.

While the LEDs in this example may thus be turned on one at time in sequence, it will be appreciated that the system is not limited thereto. There may be measurement modes in which it is desirable to turn on more than one LED or other illumination source at once on the same target area. Or, to leave on a white LED.

The relative reflectance of each actuated LEDs color or wavelength may measured by using conventional circuitry and/or software for amplifying and integrating the respective outputs of the photodiode detector chip 14 array of photo-sites, which also has integral sample and hold circuitry. As discussed, the LED pulsing and detector sampling rate is sufficiently non-critical and rapid for sampling each of multiple reasonable size color test patches on a normal size copy sheet moving by the spectrophotometer even for a high speed printer moving sheets rapidly through its paper path. However, by briefly pulsing the common LED driver voltage source to provide brief LED drive currents at a level above what is sustainable in a continuous current mode, even higher flux detection signals can obtained and the test patch can thus be interrogated in a shorter time period. In any case, by thresholding and/or integrating the output signals, enhanced signal-to-noise ratios can be achieved. It may be seen that FIG. 3 shows merely one example of a relatively simple and straightforward circuit. It, or various alternatives, can be readily implemented in an on-board hybrid chip or other architecture.

An additional conventional LED light emitter and detector may be integrated or separately mounted to detect black fiduciary or timing marks 33 printed on the test sheet 30 of FIG. 4, thereby providing an enable signal for illumination and reading within the respective color test patch areas. Those fiduciary marks 33 indicate the presence of an adjacent test patch 31 in the field of view of the spectrophotometer 12. However, it will be appreciated that with sufficiently accurate sheet timing and positional information already conventionally provided in the printer 20 controller 100, or provided by spectrophotometer output data, such fiducial marks 33 may not be needed. These fiducial marks 33 may be along side of their corresponding color test patch or patch area as shown in FIG. 4, or in between each (spaced apart) color test area. I.e., the fiducial marks may be parallel to, or in line with, the test patches in the direction of motion of the test sheet relative to the spectrophotometer.

Individual calibration for each of the spectrophotometer's LED spectral energy outputs may be done by using a standard white (or other) tile test target of known reflectivity for the spectrophotometer to convert each LED measurement to absolute reflectance values. This calibration can be done frequently, automatically, and without removing the spectrophotometer from the printer with a standard white calibration tile test surface, such as 47 shown in FIG. 6, being manually, or preferably automatically (as by a solenoid), placed oppositely from the spectrophotometer 12, on the other side of the paper path 40 but in the field of view of the photosensor array and its lens systems 13, 18 and 19. Thus, during any selected, or all, of the inter-sheet gaps (the normal spacing between printed sheets in the sheet path of the printer) a recalibration can be carried out without having to move or refocus the spectrophotometer.

This or other calibration systems can convert the individual output energies of the respective LEDs at that point in time on the calibration tile 47 into respective individual reflectance measurement values from the photosensor array (s). That calibration data can then be electronically compared to previously stored standard characteristics data in the controller 100, or elsewhere, to provide calibration data for the spectrophotometer 12, which may be used for calibration of its other, color test patch generated, data. The calibration data can also be used to adjust the individual LED output energies to compensate for LED aging or other output changes, by adjusting the applied current or voltage (if that is individually programmable) or by increasing the respective turn-on times of the LEDs.

Initial spectrophotometer calibration data may be stored in an integral PROM IC shipped with the spectrophotometer, if desired. Alternatively, LED output initial calibration data may be programmed into the software being used to analyze the output of the spectrophotometer in other known manners, such as loading it into the disc storage or other programmable memory of the printer controller 100 or system print server.

It is well known to use conventional optical filters of different colors for each of respectively different color LED spectrophotometer target illumination sources. In particular, it is well known to use such color filters to exclude secondary emissions from LEDs, and/or to further narrow the output spectra of LED illumination sources. Such color filters are believed to be used for that purpose in some Accuracy Microsensors™ LED based commercial products, for example. However, it will be further appreciated by those skilled in this art that such color filters are not needed for those LEDs having sufficiently narrow bandwidths or for those LEDs which do not have secondary emissions that need to be suppressed. Therefore, filters may, but need not, be employed for the LEDs of the subject spectrophotometer.

It will also be noted that spectrophotometers have been made using illumination sources other than LEDs. For example, multiple electroluminescent (EL) emitters with filter and active layers as in HP U.S. Pat. No. 5,671,059, issued Sep. 23, 1997, or tenon or incandescent lamps. Also, white (instead of narrow spectrum) LED illuminators and plural sensors with different color filters are disclosed in EP 0 921 381 A2 published Sep. 6, 1999 for a color sensor for inspecting color print on newspaper or other printed products.

In the particular spectrophotometer embodiment 12 configuration shown in FIG. 2, all of the plural different color emission LEDs are together in one central unit, board, or chip, projecting light substantially in parallel along the central or zero axis of the spectrophotometer 12 at 90 degrees to the test target (e.g., the color patch on the moving sheet of paper), so as to provide a substantially circular, rather than elliptical, illuminated area 35 of the test target 31.

As also shown in FIG. 2, it may be preferable in that embodiment to mount one or more photo-sensor chips 14 in the spectrophotometer with the planar light receiving surface thereof physically oriented at 90 degrees to (perpendicular to) the test target area plane while receiving the reflected light from the test target optically oriented at 45 degrees to the test target.

As explained in the cross-referenced U.S. application Ser. No. 09/862,945, filed May 22, 2001, now allowed, Attorney Docket No. D/A1024, the change from a 45–0 degree system to a 0–45 degree system has been discovered to reduce measurement errors from test target angular or azimuthal misalignment relative to the spectrophotometer 12.

While the embodiment disclosed herein is preferred, it will be appreciated from this teaching that various alternatives, modifications, variations or improvements therein may be made by those skilled in the art, which are intended to be encompassed by the following claims.

What is claimed is:

1. In a color analysis method in which sheets with multiple different color printed test patches are moved relative to a color analyzing spectrophotometer for analysis of respective said color test patches, and wherein fiducial marks are printed adjacent to respective said test patches to be optically detected by a fiducial mark detector to provide a fiducial mark triggering system for providing triggering signals from said fiducial marks for said analysis of said respective test patches;

the improvement comprising the automatic diagnostic testing of said fiducial mark triggering system by automatically generating at least one special fiducial mark triggering system test sheet which is read by said fiducial mark detector.

2. The color analysis method of claim 1, wherein said spectrophotometer is mounted in the paper path of a color printer and said special fiducial mark triggering system test sheet is printed by said color printer and fed through said paper path past said fiducial mark detector.

3. The color analysis method of claim 1, wherein more than one said special fiducial mark triggering system test sheet is generated, and wherein at least one said special fiducial mark triggering system test sheet Is printed with said test patches of varying density black.

4. The color analysis method of claim 1, wherein more than one said special fiducial mark triggering system test sheet is generated, and wherein at least one said test sheet is printed with test patches of varying density black, and wherein then at least one additional said test sheet is printed with variable density black fiducial marks.

5. The color analysis method of claim 4, wherein said variable density fiducial marks of said at least one additional said test sheet are printed with variable density data derived from said at least one said test sheet printed with test patches of varying density black.

6. In a color analysis method in which sheets with multiple different color printed test patches are moved relative to a color analyzing spectrophotometer for analysis of respective said color test patches, and wherein fiducial marks are printed adjacent to respective said test patches to be optically detected by a fiducial mark detector to provide a fiducial mark triggering system for providing triggering signals from said fiducial marks for said analysis of said respective test patches;

the improvement comprising the automatic diagnostic testing sequence of said spectrophotometer and said fiducial mark triggering system by automatically generating a sequence of different test sheets of different printed optical densities which are read by said fiducial mark detector and said spectrophotometer.

7. The color analysis method of claim 6, wherein said spectrophotometer is mounted in the paper path of a color printer and said sequence of different test sheets is printed by said color printer and fed through said paper path past said spectrophotometer to be read by said spectrophotometer and said fiducial mark detector.

8. The color analysis method of claim 6, wherein said sequence of different test sheets includes both minimum and maximum density printed said test sheets.

9. The color analysis method of claim 6, wherein at least one said test sheet is printed with different test patches of varying density black.

10. The color analysis method of claim 6, wherein at least one said test sheet is printed with a single large test patch of maximum density black.

11. The color analysis method of claim 6, wherein said spectrophotometer is mounted in the paper path of a color printer and said sequence of different test sheets is printed by said color printer and fed through said paper path past said spectrophotometer to be read by said spectrophotometer and said fiducial mark detector, and wherein said diagnostic sequence of different test sheets includes a minimum print density full scale output test, a maximum print density minimum scale output test, a patch centering test and a grey scale output test, and fiducial mark detector testing.

12. The color analysis method of claim 6, wherein at least one additional diagnostic routine is automatically initiated in response to detecting a failure in said automatic diagnostic testing sequence.

13. The color analysis method of claim 6, wherein at least one said test sheet is printed with a single large test patch that is imprinted.

* * * * *